United States Patent
Yuen

(10) Patent No.: US 7,919,062 B2
(45) Date of Patent: Apr. 5, 2011

(54) MODULAR MICROFLUIDIC SYSTEM AND METHOD FOR BUILDING A MODULAR MICROFLUDIC SYSTEM

(75) Inventor: Po Ki Yuen, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 430 days.

(21) Appl. No.: 12/077,621

(22) Filed: Mar. 20, 2008

(65) Prior Publication Data

US 2009/0236226 A1    Sep. 24, 2009

(51) Int. Cl.
  *G01N 15/06* (2006.01)
  *G01N 33/00* (2006.01)
  *G01N 33/48* (2006.01)

(52) U.S. Cl. ......... 422/502; 422/50; 422/68.1; 422/503; 436/43; 436/177; 436/180

(58) Field of Classification Search ............ 422/100, 422/50, 55, 58, 68.1, 81, 82, 82.05, 101, 422/102, 103, 104; 436/43, 53, 63
See application file for complete search history.

(56) References Cited

U.S. PATENT DOCUMENTS

| | | | | |
|---|---|---|---|---|
| 3,548,849 A * | 12/1970 | Jahnke et al. | ................. | 137/815 |
| 3,658,088 A * | 4/1972 | Jensen et al. | ............... | 137/561 R |
| 5,580,523 A * | 12/1996 | Bard | ............................. | 422/50 |
| 6,536,477 B1 | 3/2003 | O'Connor et al. | ............ | 137/833 |
| 6,827,095 B2 | 12/2004 | O'Connor et al. | ......... | 137/15.01 |
| 6,827,831 B1 * | 12/2004 | Chow et al. | .................... | 204/604 |
| 7,011,793 B2 | 3/2006 | Zhou et al. | ..................... | 422/100 |
| 2002/0028504 A1 * | 3/2002 | MacCaskill et al. | ........ | 435/289.1 |
| 2002/0192112 A1 * | 12/2002 | Chow | ............................. | 422/63 |
| 2003/0012697 A1 * | 1/2003 | Hahn et al. | ..................... | 422/99 |
| 2004/0087033 A1 | 5/2004 | Schembri | ...................... | 436/180 |
| 2004/0228771 A1 | 11/2004 | Zhou et al. | ..................... | 422/102 |
| 2005/0161669 A1 | 7/2005 | Jovanovich et al. | ............ | 257/48 |
| 2005/0255003 A1 | 11/2005 | Summersgill et al. | ........ | 422/100 |
| 2006/0078475 A1 | 4/2006 | Tai et al. | ....................... | 422/102 |

FOREIGN PATENT DOCUMENTS

WO    WO 2005/056186    6/2005

OTHER PUBLICATIONS

Shaikh, et al., A modular microfluidic architecture for integrated biochemical analysis, *Proceedings of the National Academy of Sciences of the United States of America*, 2005, 102, 9745-9750.

* cited by examiner

Primary Examiner — Brian J Sines
(74) Attorney, Agent, or Firm — Susan S. Wilks

(57) ABSTRACT

A "plug-n-play" modular microfluidic system is described herein which can be made by connecting multiple microfluidic components together to form a larger integrated system. For example, the modular microfluidic system includes a motherboard with interconnecting channels and integrated electrodes (or holes for electrodes to pass) which provide electronic connections to external data acquisition and system control devices. The modular microfluidic system can also include channel inserts (which are placed in the channels of the motherboard), heater units, actuator units, fitting components and microchips/modules with different functionalities which are placed on the motherboard.

32 Claims, 41 Drawing Sheets

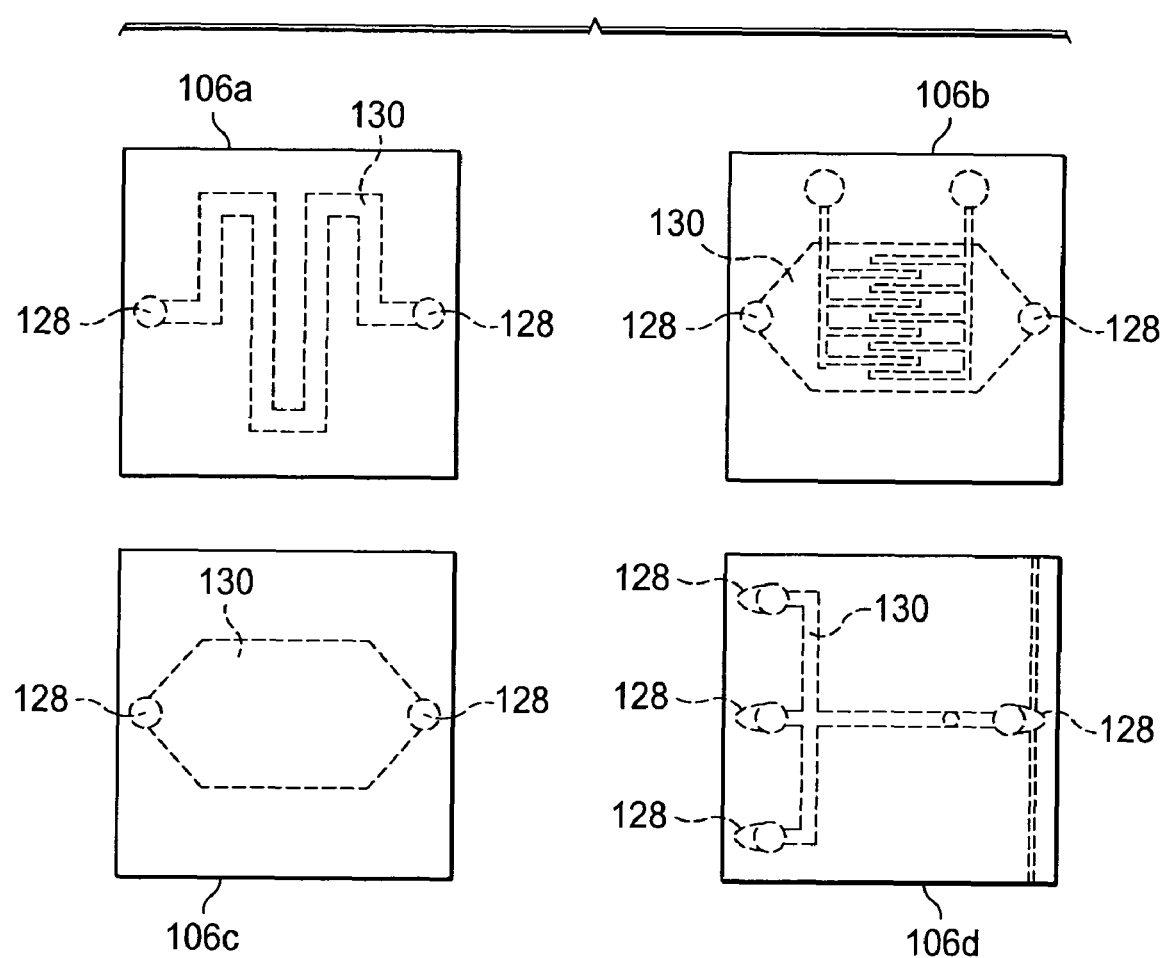

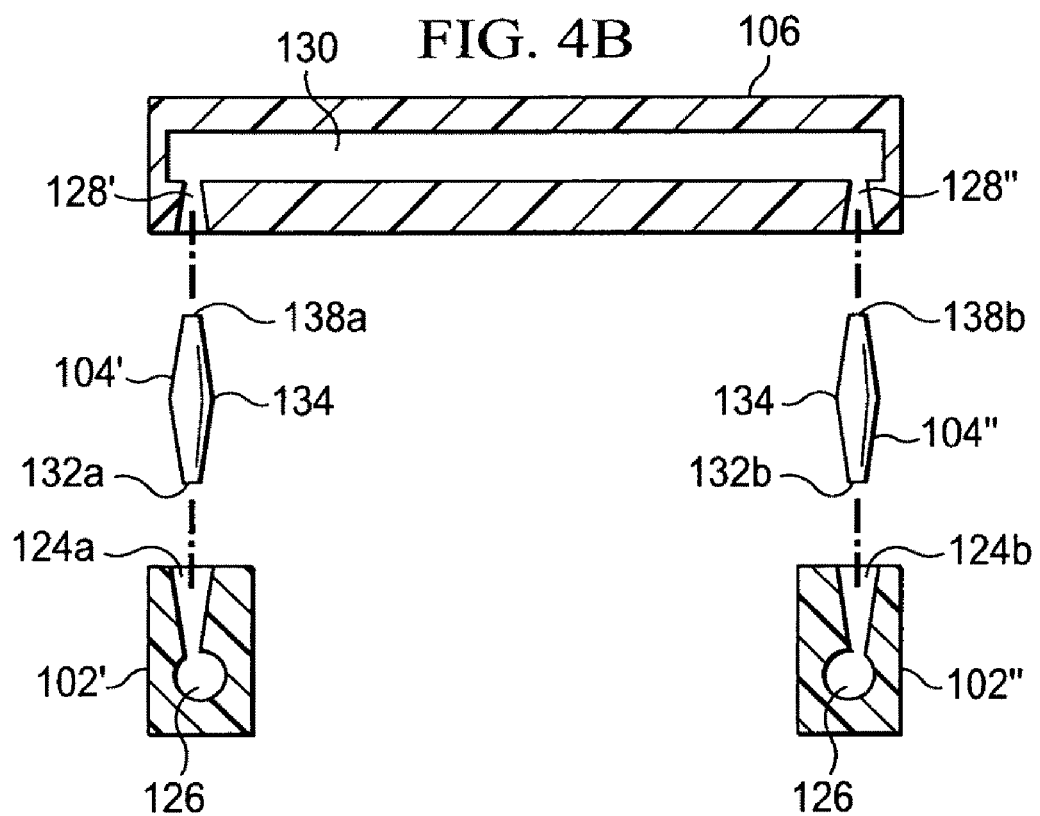
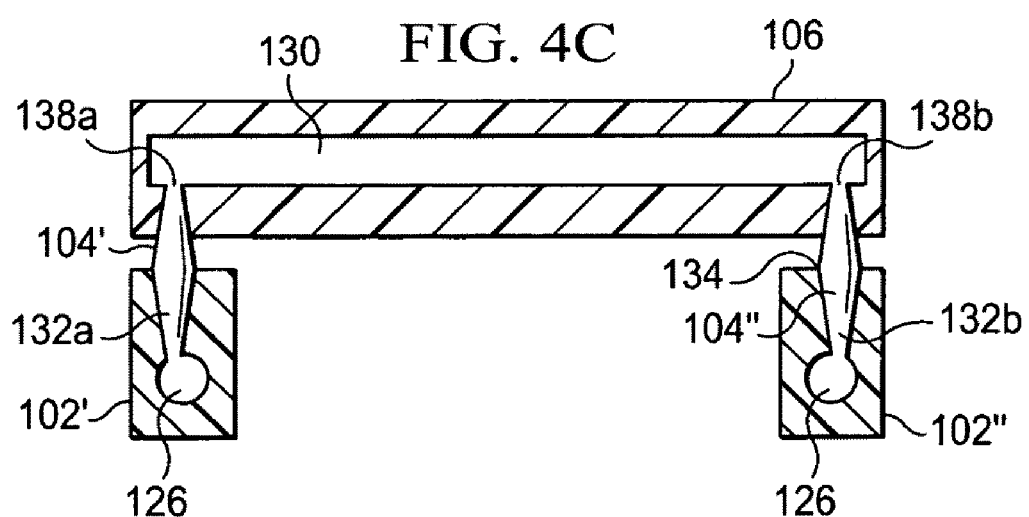

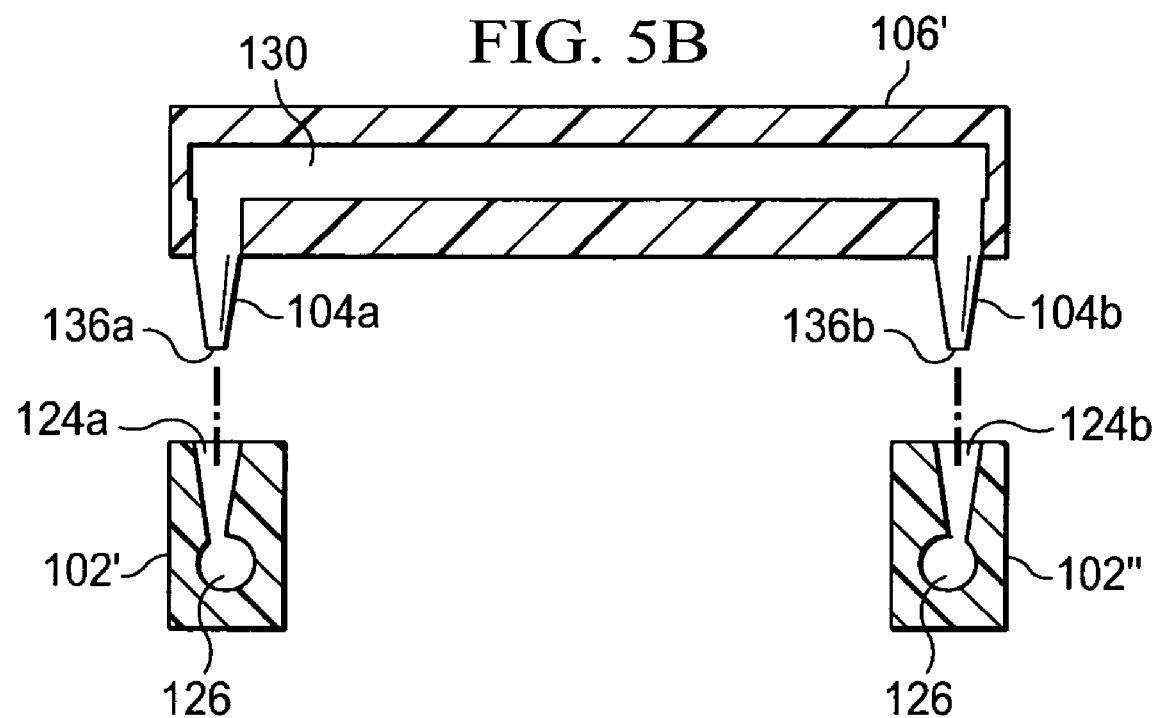
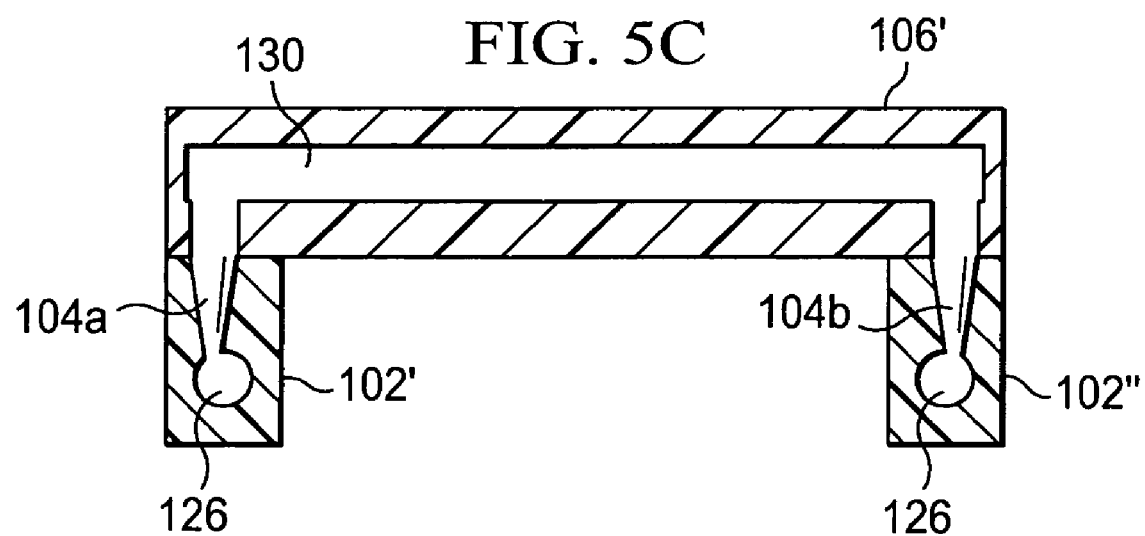

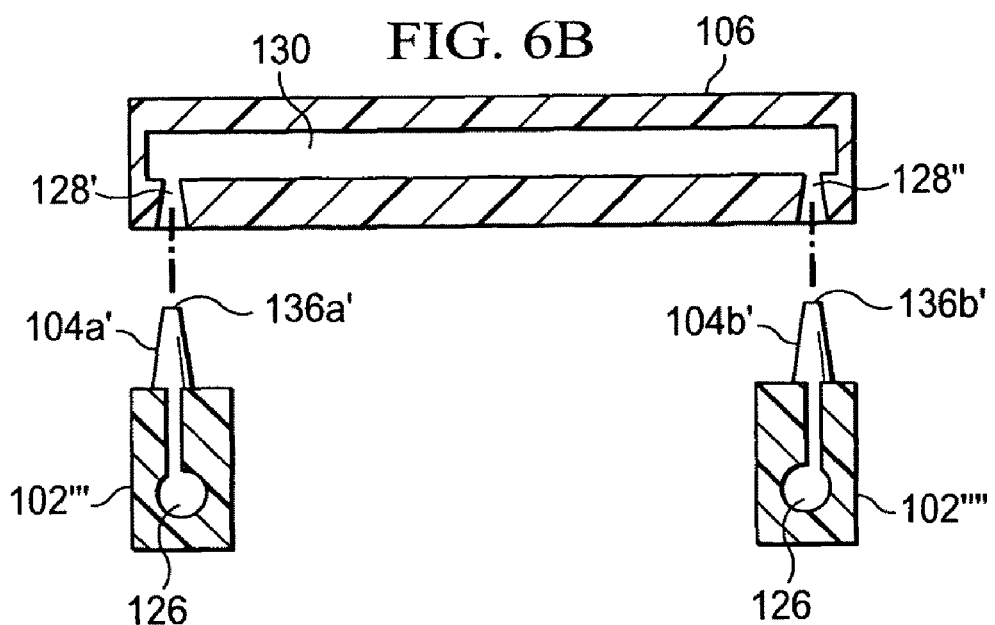
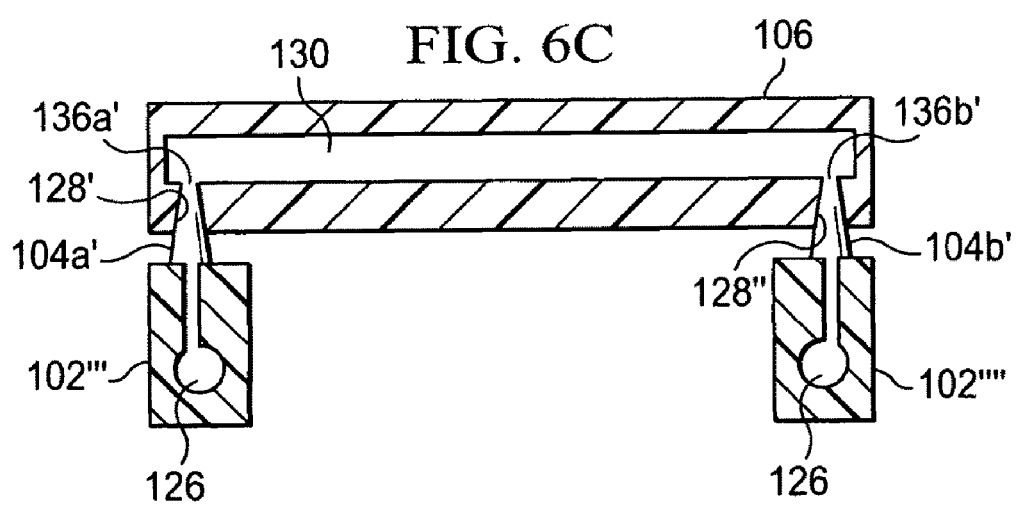

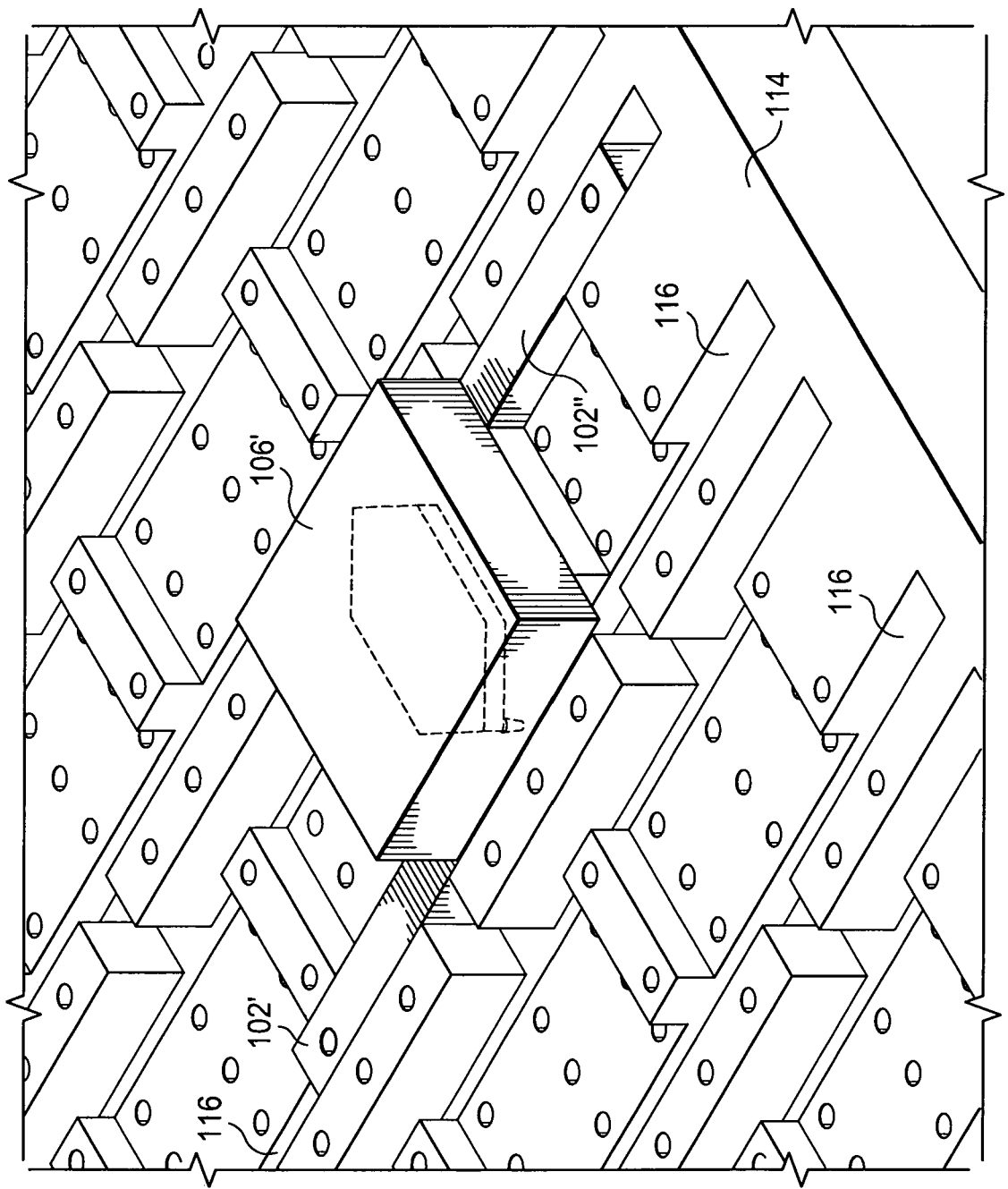

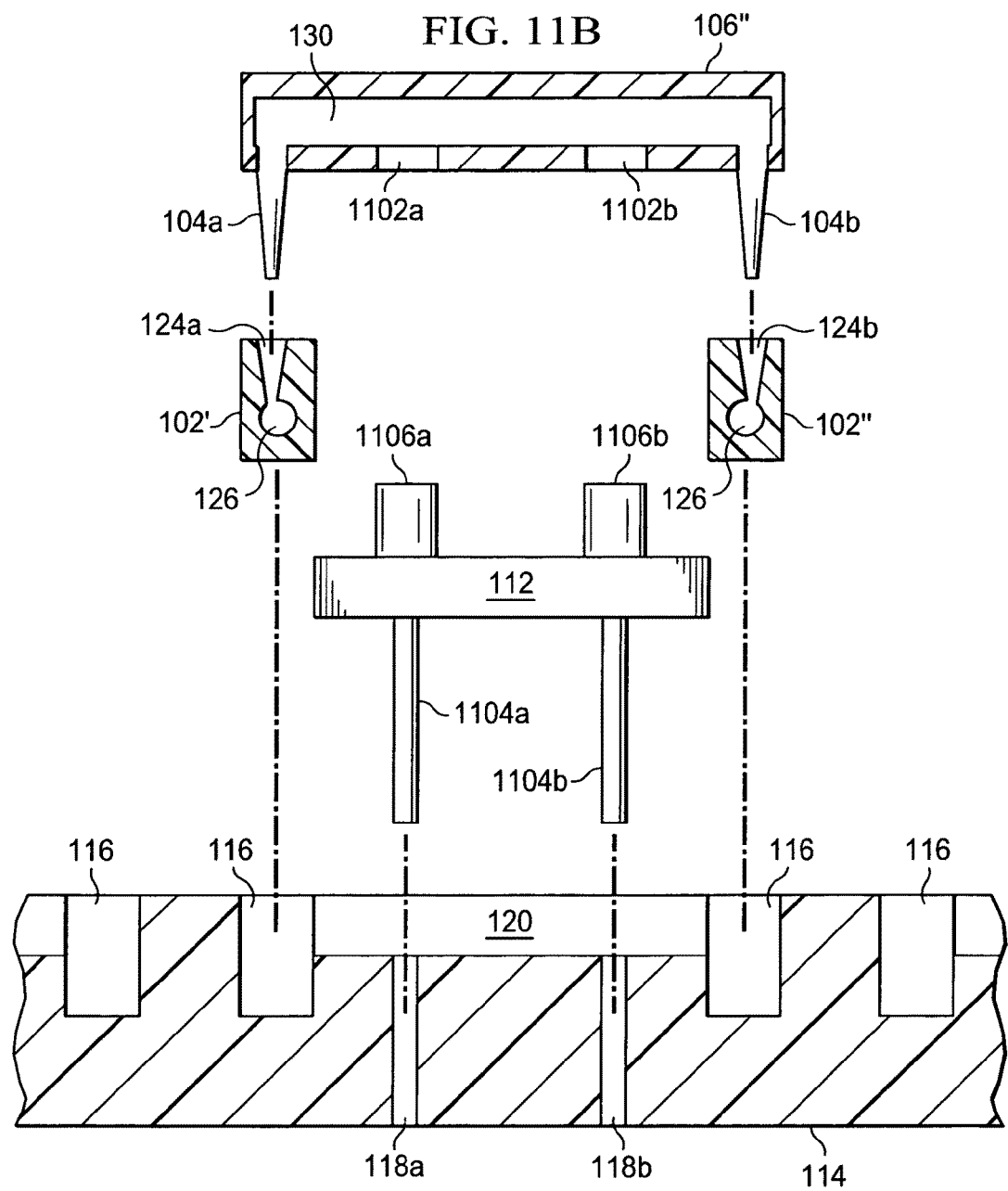

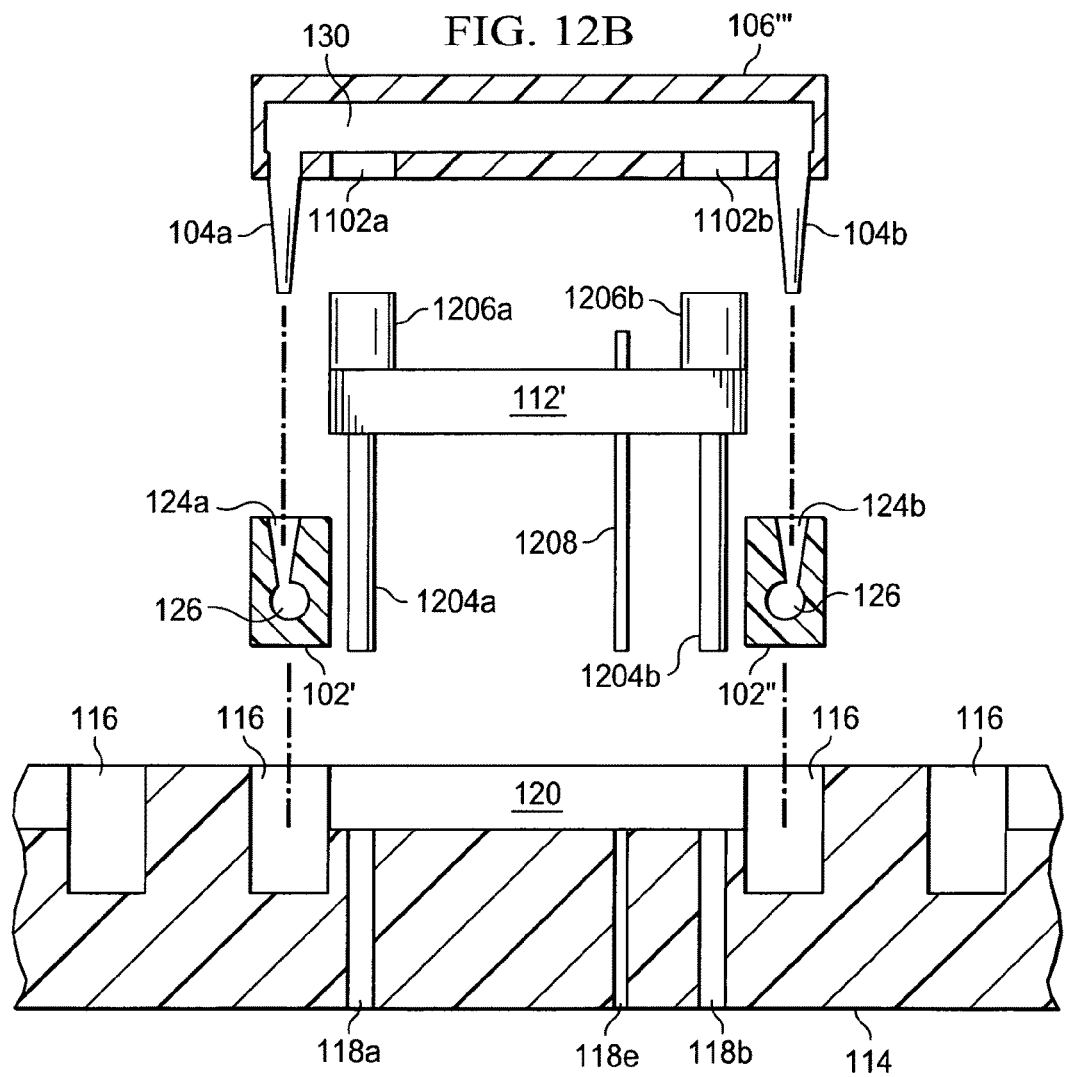

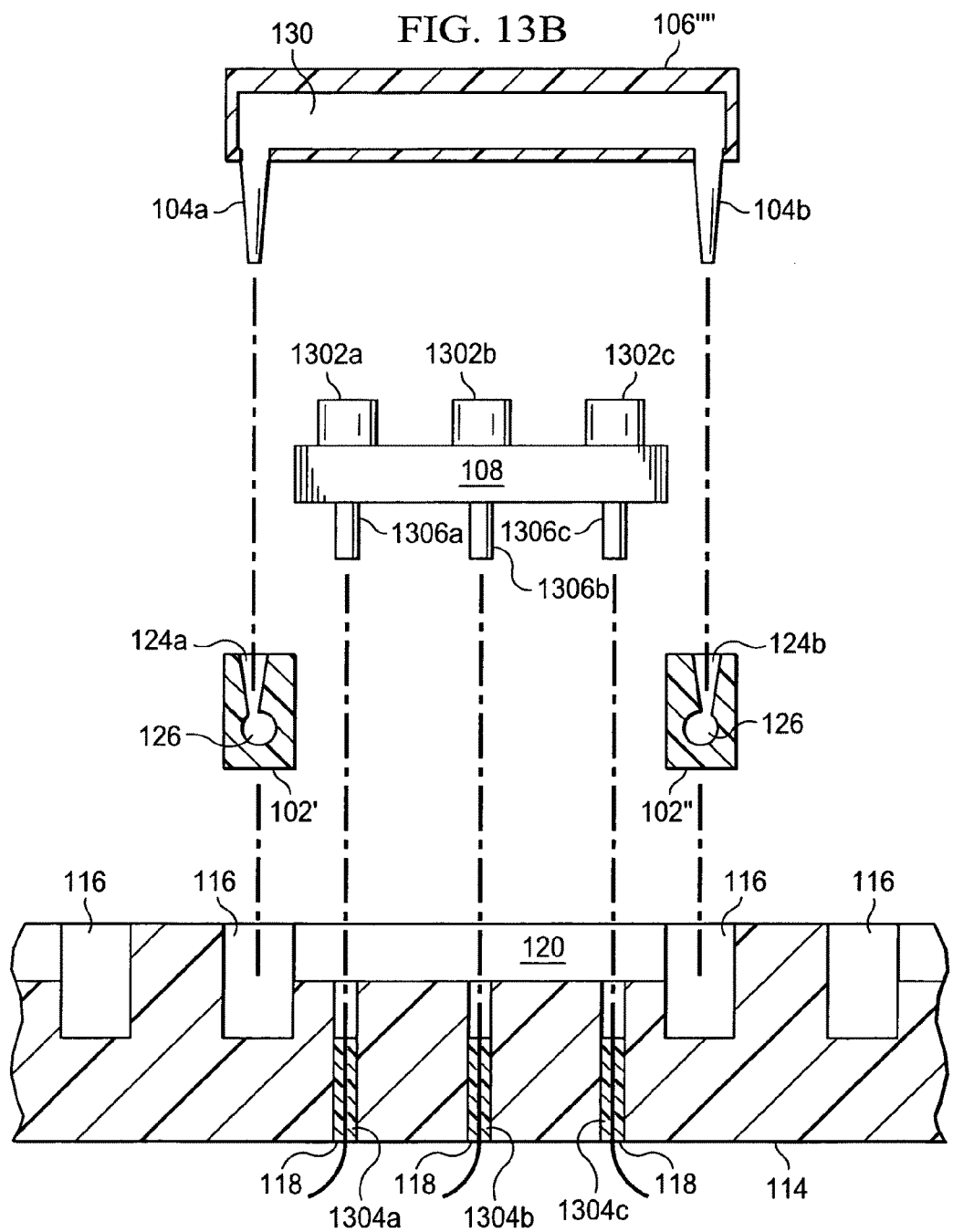

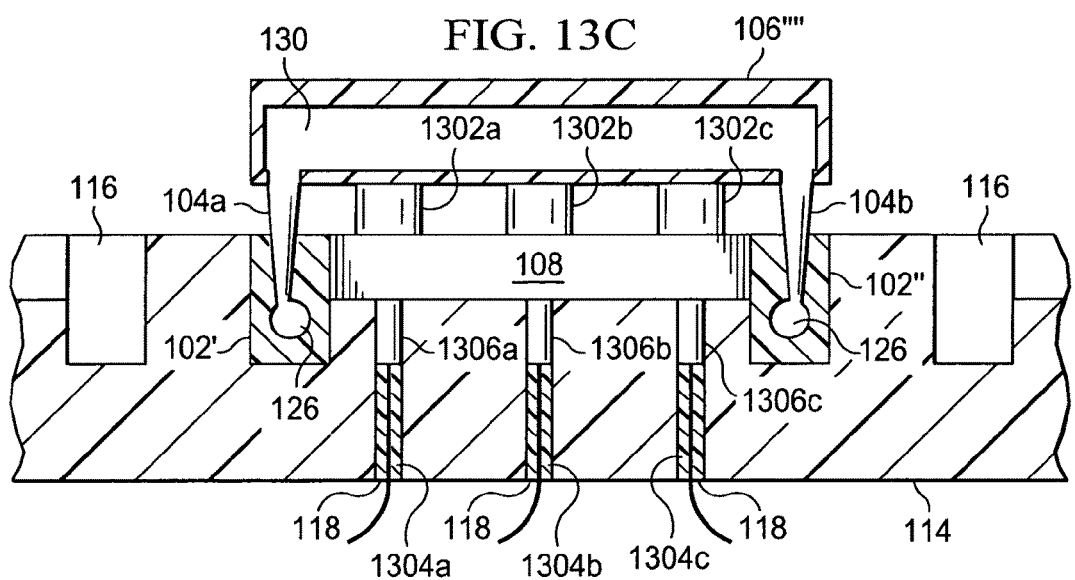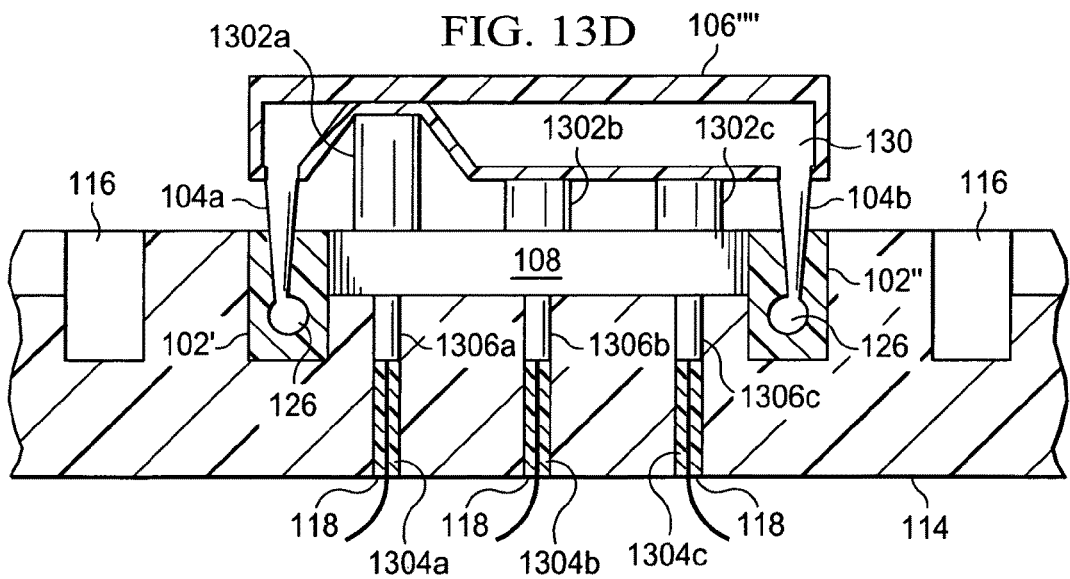

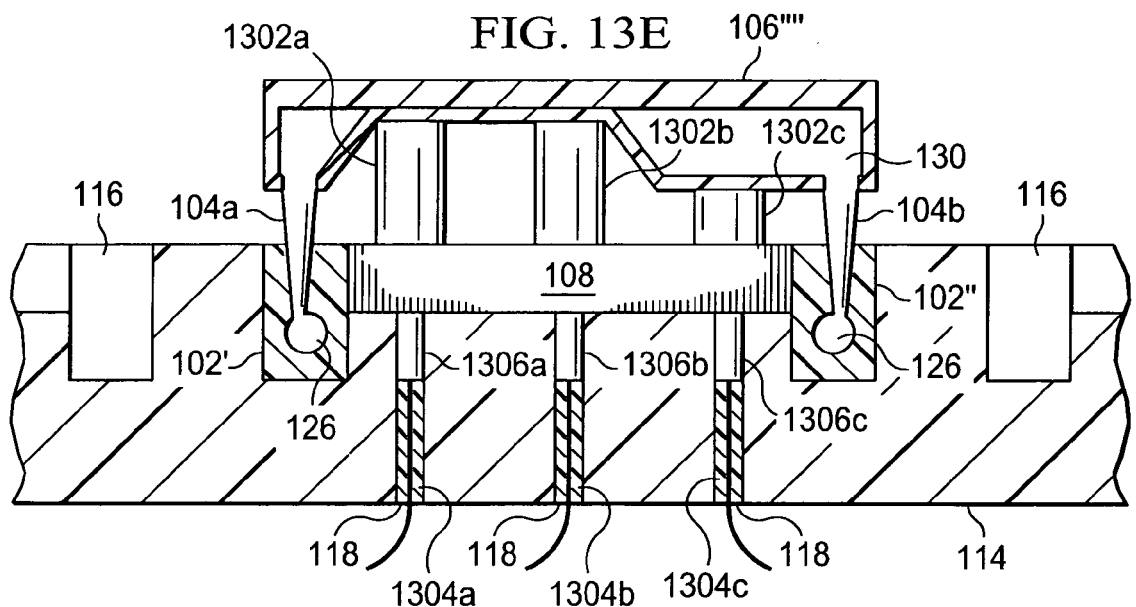
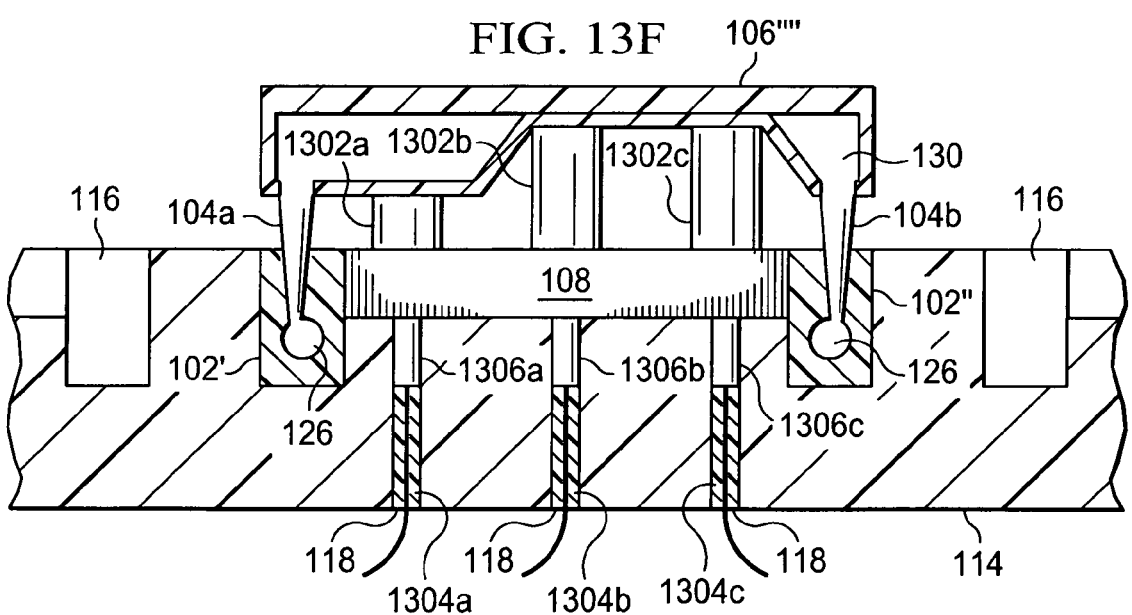

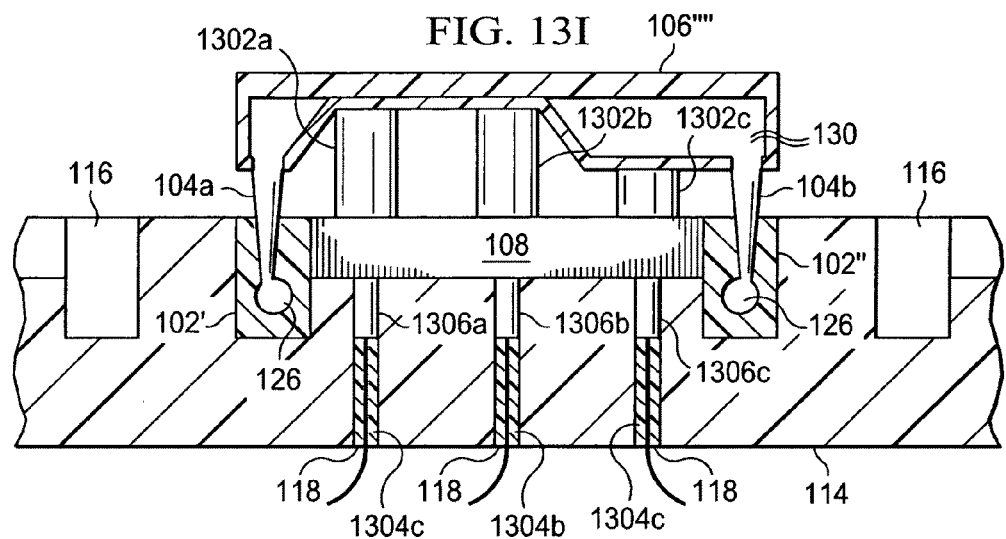
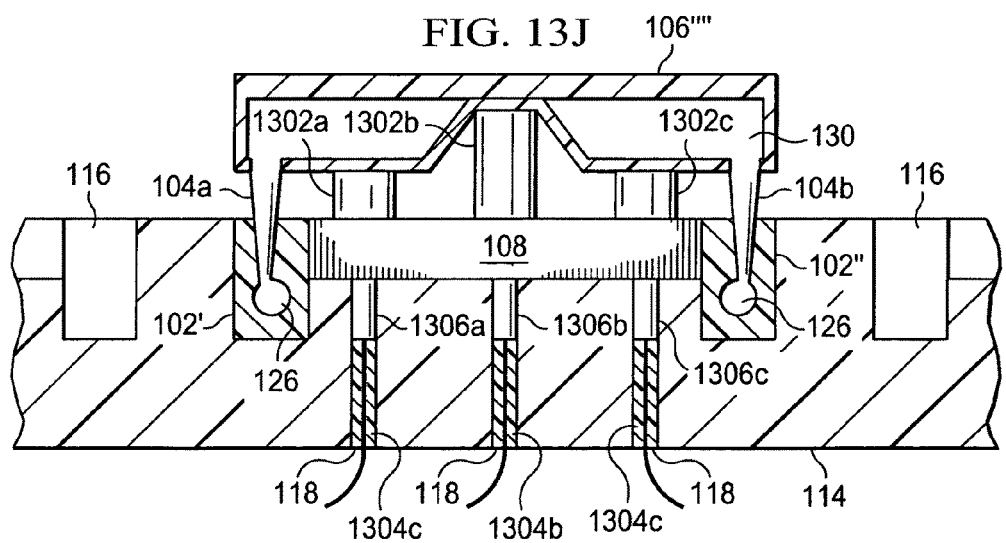

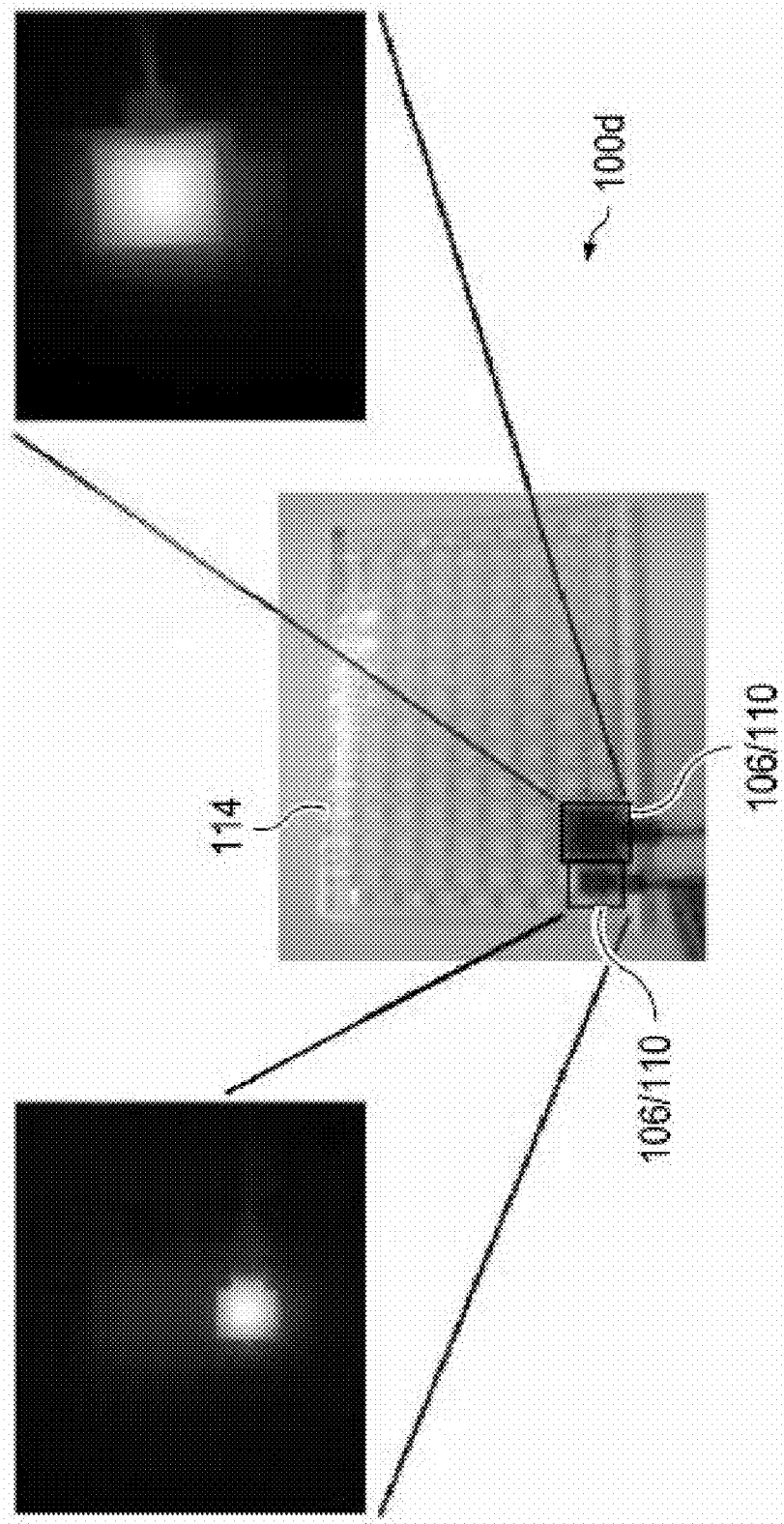

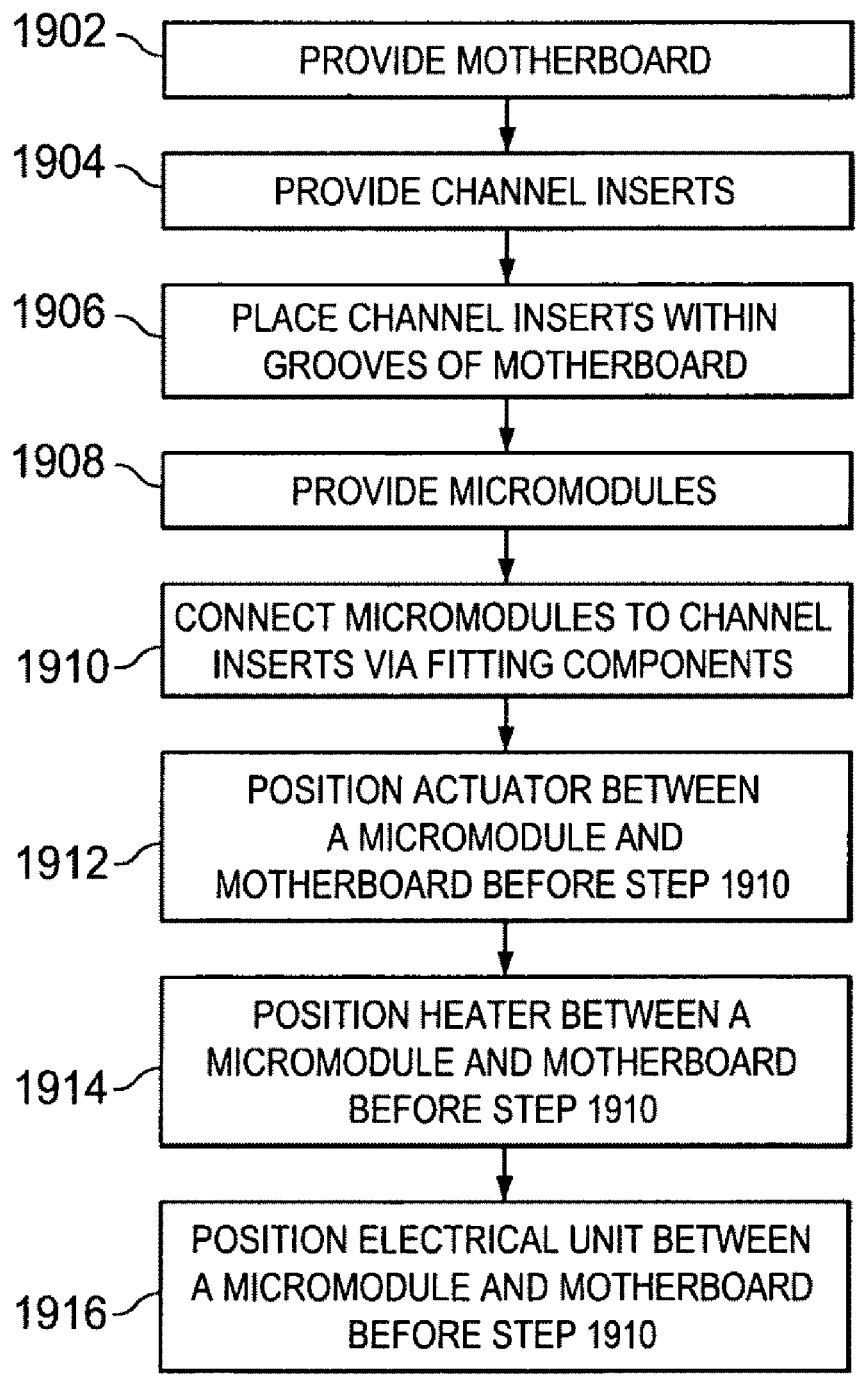

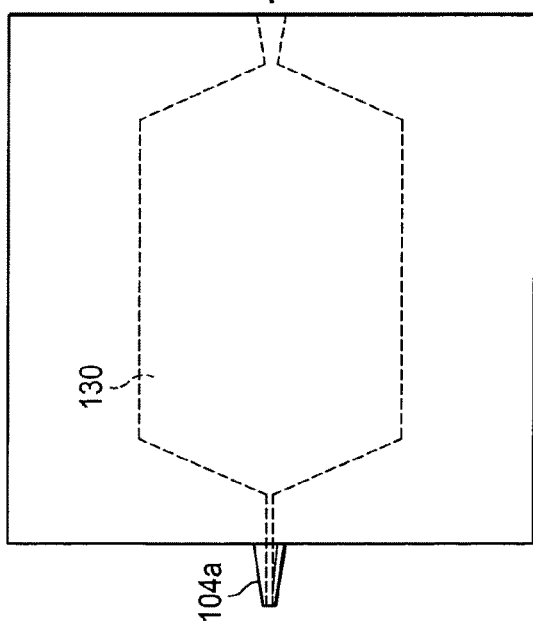
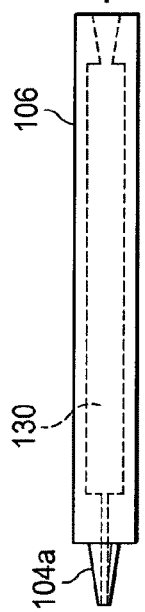
FIG. 22A
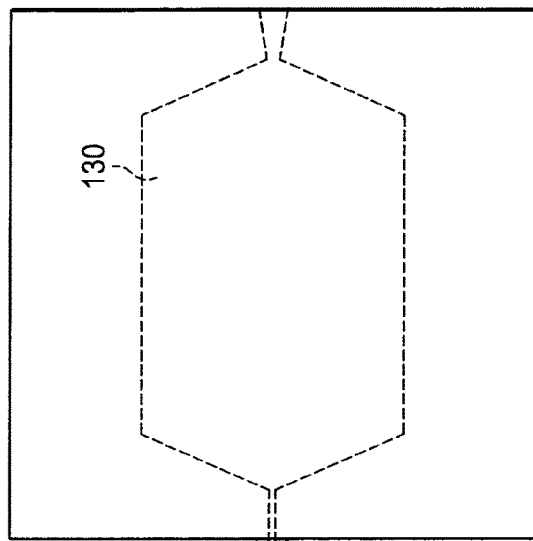
FIG. 22B

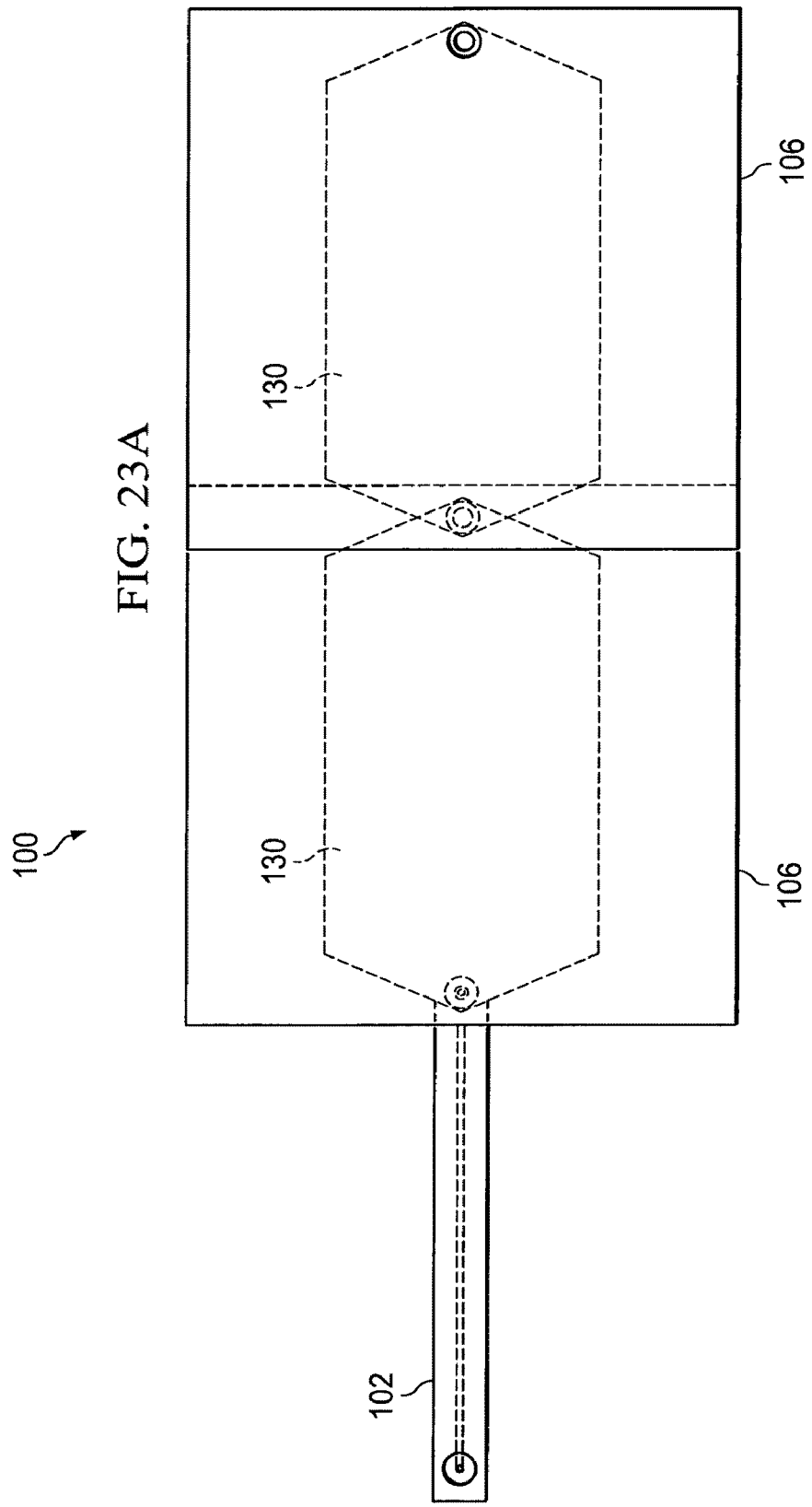

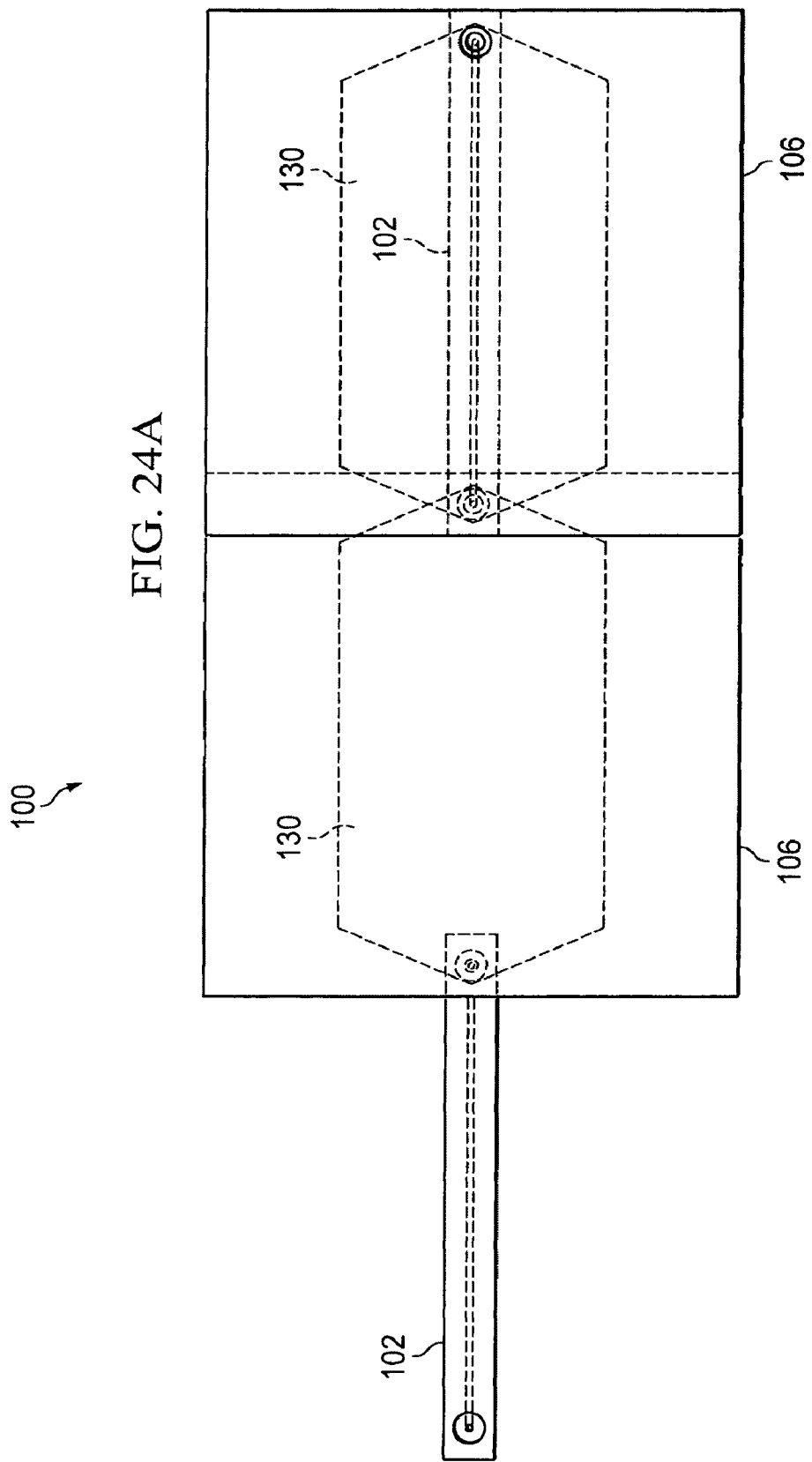

MODULAR MICROFLUIDIC SYSTEM AND METHOD FOR BUILDING A MODULAR MICROFLUDIC SYSTEM

TECHNICAL FIELD

The present invention relates in general to the chemical-biological field and, in particular, to a modular microfluidic system and a method for building a modular microfluidic system.

BACKGROUND

Manufacturers have had a growing interest in the manufacture of microfluidic systems which are used for performing chemical and biological studies. Microfluidic systems are popular since they allow complicated chemical and biological reactions to be carried out while using very small volumes of fluid. The typical microfluidic system has many different components such as, for example, reaction chambers, mixers, and detectors that communicate fluidically via interconnects or microchannels. The typical microfluidic system also has components integrated therein like heaters, actuators and valves which are used for heating, pumping and directing the fluid samples.

Microfluidic systems implement microfluidic technology which involves the miniaturization and integration of complex systems that provide several benefits like reducing the consumption of expensive reagents, reducing reaction time, shortening temperature cycling times, enhancing mixing, and precisely manipulating small volumes of fluid. Microfluidic technology has made it possible to automate macro-scale, bench-top laboratory protocols and encapsulate them into low-cost, portable microfluidic systems.

However, today to develop a highly functional microfluidic system, significant time and expertise are required to optimize the individual components and then optimize their integration to design the microfluidic system. For instance, one component may be optimized and perform well by itself but its performance may suffer once it has been integrated with other components due to poor integration or due to a change in the operating conditions. Plus, a slight modification to the microfluidic system frequently requires rebuilding the entire system, which results in long development times and incurs substantial costs.

Thus, it would be highly desirable to have a fast turn around time and low cost tool that allows for rapid customization of components to build a functional microfluidic system. This need and other needs have been satisfied by the "plug-n-play" modular microfluidic system and the method for building the "plug-n-play" modular microfluidic system of the present invention.

SUMMARY

In one aspect, the present invention includes a modular microfluidic system that has: (a) a motherboard having a top surface with a plurality of channels formed therein; (b) at least one channel insert, each channel insert is sized to be placed within one of the channels within said motherboard; (c) at least one fitting component; and (d) at least one micromodule, where one of the at least one micromodule is coupled via one fitting component to one channel insert, wherein there is fluid communication between the one micromodule, the one fitting component, and the one channel insert.

In another aspect, the present invention includes a method for building a modular microfluidic device by: (a) providing a motherboard having a top surface with a plurality of channels; (b) providing a plurality of channel inserts; (c) placing one or more of the channel inserts within one or more of the channels within the motherboard; (d) providing at least one micromodule; and (e) connecting one of the micromodules using at least one fitting component to at least one channel insert located within the channel of the motherboard, wherein there is fluid communication between the one micromodule, the at least one fitting component, and the at least one channel insert.

In yet another aspect, the present invention includes a kit for building a microfluidic device. The kit includes: (a) a motherboard having a top surface with a plurality of channels formed therein; (b) at least one channel insert, each channel insert is sized to be placed within one of the channels within the motherboard; (c) at least one fitting component; and (d) at least one micromodule, where the microfluidic device is built using at a minimum one micromodule which is connected to one fitting component such that there is fluidic-gaseous communication between the one micromodule and the one fitting component, where the one micromodule and the one fitting component are coupled together via a barbed fitting, a taper fitting, a Luer fitting or a Luer lock fitting.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein:

FIG. 3 illustrates a wide-variety of different micromodules (or microchip modules) that can be used to build the modular microfluidic device in accordance with embodiments of the present invention;

FIGS. 4A-4C illustrate three drawings that are used to help explain how one micromodule can be connected to two fitting components which are connected to two channel inserts in accordance with an embodiment of the present invention;

FIGS. 5A-5C illustrate three drawings that are used to help explain how one micromodule can have two integral fitting components which can be connected to two channel inserts in accordance with another embodiment of the present invention;

FIGS. 6A-6C illustrate three drawings that are used to help explain how one micromodule can be connected to two channel inserts which have two integral fitting components in accordance with another embodiment of the present invention;

FIGS. 10A-10C illustrate three drawings that are used to help explain how one micromodule (with integral fitting components), two channel inserts and one heater can be attached to a motherboard in accordance with embodiments of the present invention;

FIGS. 11A-11C illustrate three drawings that are used to help explain how one micromodule (with integral fitting components), two channel inserts, and one electrical contact unit can be attached to a motherboard in accordance with embodiments of the present invention;

FIGS. 12A-12C illustrate three drawings that are used to help explain how one micromodule (with integral fitting components), four channel inserts, and one electrical contact unit can be attached to a motherboard in accordance with embodiments of the present invention;

FIGS. 13A-13C illustrate three drawings that are used to help explain how one micromodule (with integral fitting components), two channel inserts, and one actuator can be attached to a motherboard in accordance with embodiments of the present invention;

FIGS. 13D-13K illustrate multiple drawings that are used to help explain how the actuator can function as a pump or valve to control the flow of fluid within the micromodule in accordance with embodiments of the present invention;

FIGS. 14-17 illustrate multiple photos taken during experiments to test different modular microfluidic devices in accordance with embodiments of the present invention;

FIG. 19 is a flowchart illustrating the steps of a method for building a modular microfluidic system in accordance with embodiments of the present invention; and FIGS. 20-24 are basic diagrams of exemplary microfluidic devices that can be built in accordance with embodiments of the present invention.

DETAILED DESCRIPTION

The present invention relates to a "plug-n-play" microfluidic system which is made by connecting more than one microfluidic component together to form a larger integrated system. The modular microfluidic system includes a motherboard with interconnecting channels and integrated electrodes (or holes for electrodes to pass) which provide electronic connections to external data acquisition and system control devices. The modular microfluidic system also includes channel inserts (which are placed into the channels of the motherboard), heater units, actuator units, and microchips/modules with different functionalities which are placed on the motherboard 114. In embodiments, the micromodules and channel inserts are plugged into the motherboard to form an integrated microfluidic system. The micromodules and channel inserts are attached together via integrated built-in fittings or fittings that can be plugged into the channels and the micromodules to provide leak free fluidic connections. In addition, heaters and actuators can be placed anywhere on the motherboard and used to provide heating, pumping and valving for the integrated modular microfluidic system. After assembly and testing, all the components can be detached and re-arranged for further use in building another modular microfluidic system. Thus, different configurations of an integrated modular microfluidic system can be designed and built with ease. A detailed discussion about the modular microfluidic system and its various components is provided below with respect to FIGS. 1-13.

Figure 1A:
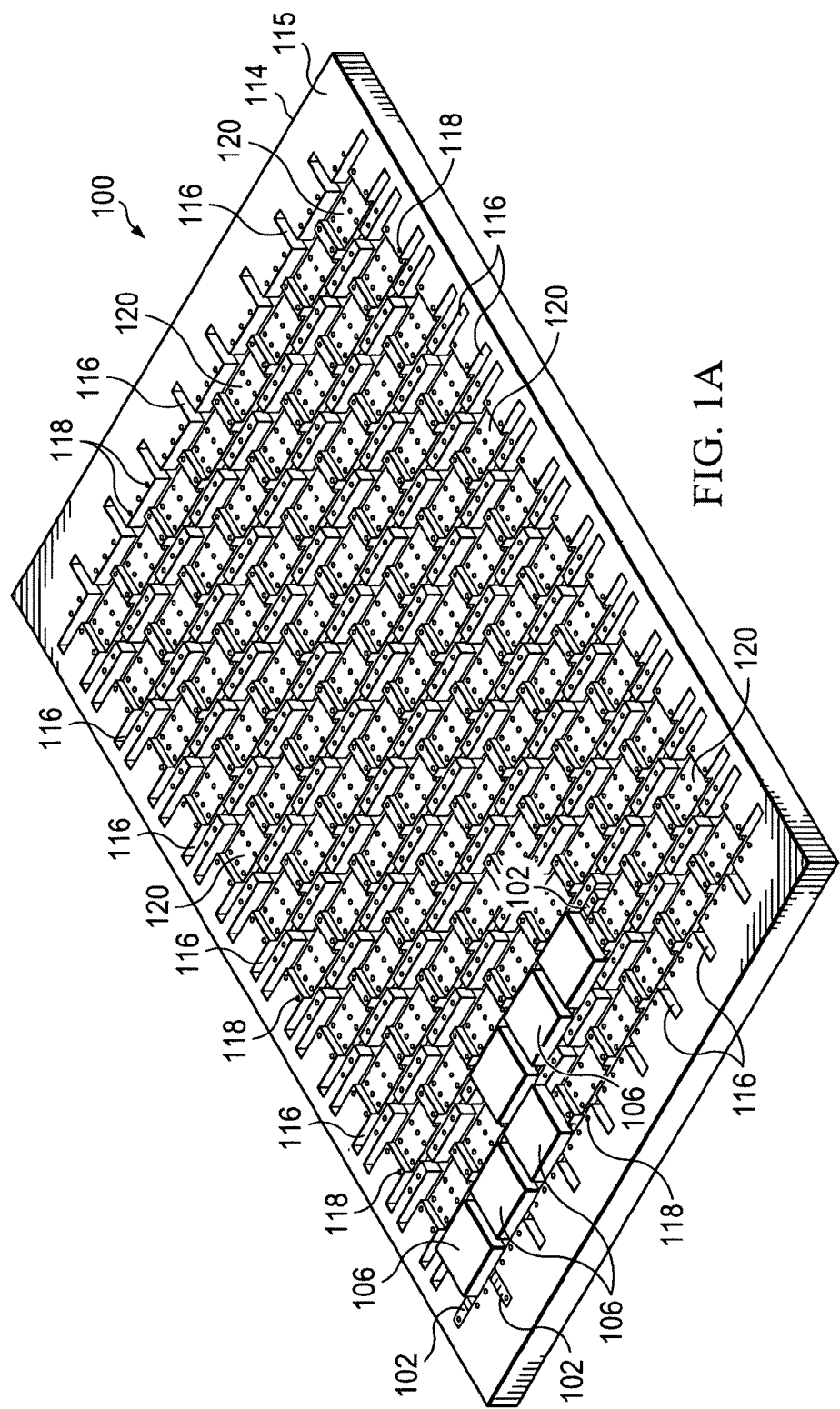
FIGS. 1A-1B illustrate two different exemplary modular microfluidic systems in accordance with embodiments of the present invention.

Referring to FIG. 1A, there is illustrated a perspective view of an exemplary modular microfluidic system 100 in accordance with embodiments of the present invention. The modular microfluidic system 100 can have any combination of a wide-variety of components 102, 104, 106, 108, 110 and 112 plugged into or placed on top of a motherboard 114 (note: components 104, 108 and 110 and 112 can be seen in FIGS. 4 and 10-13). The exemplary motherboard 114 shown has a top surface 115 with a network of interconnect channels/grooves 116, holes 118 within which electrodes or optical fibers can pass through, and depressions 120 within which different components 106, 108, 110 and 112 can be placed. If desired, the motherboard 114 may also have integrated electrodes formed therein instead of or in addition to the holes 118 through which electrodes or optical fibers can pass through (e.g., see FIG. 12). The different components 102, 104, 106, 108, 110 and 112 that can be plugged into or placed on top of a motherboard 114 include channel inserts 102 (or channel connections 102), fitting components 104 (see, for example, FIG. 4A), microchip modules or micromodules 106, actuators 108 (see for example FIGS. 13A and 13B), heaters 110 (see for example FIG. 11B) and electrical contact units 112 (see for example FIG. 1B).

Figure 1B:
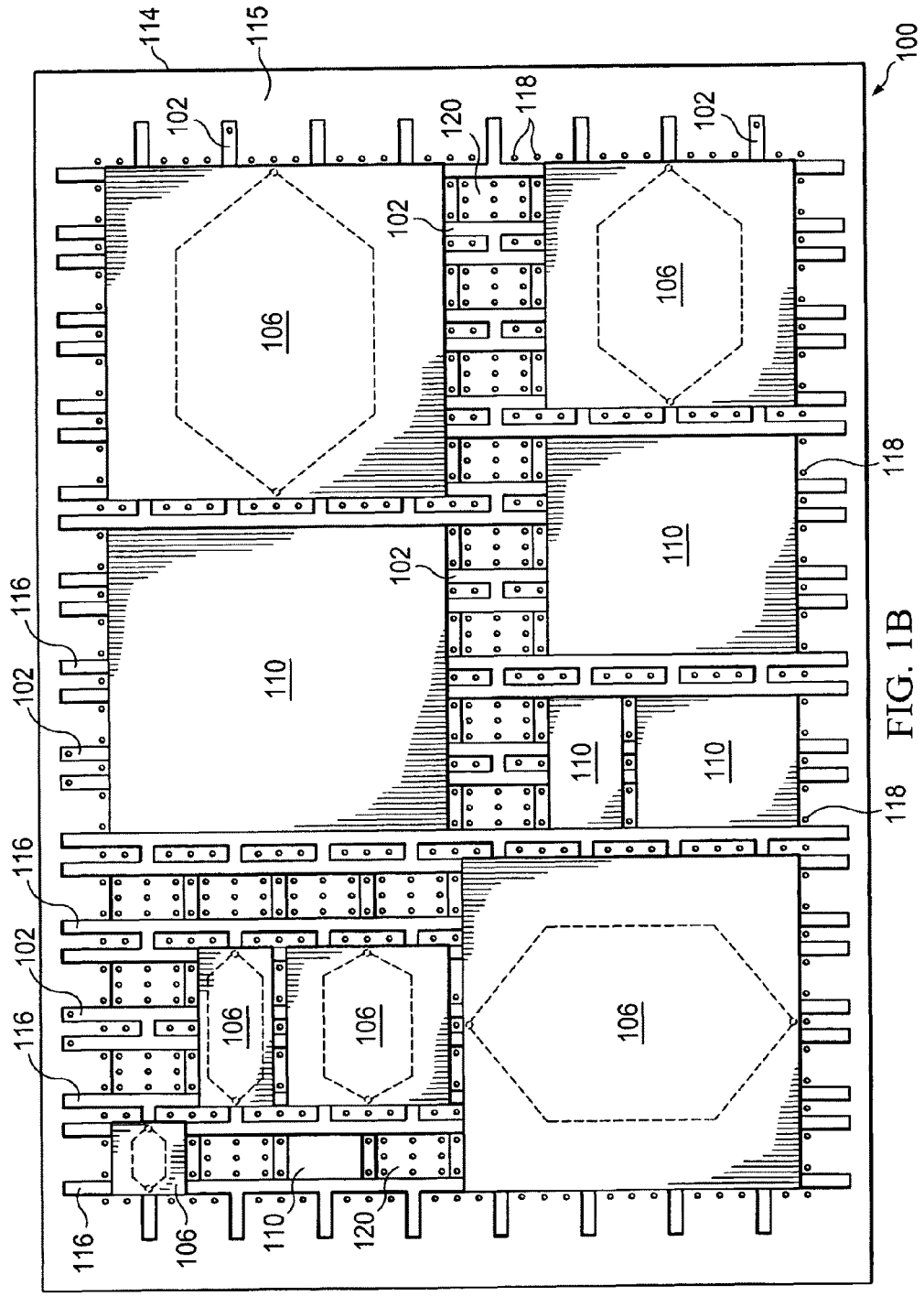

FIG. 1B illustrates an embodiment of the present invention where different sized micromodules 106, channel inserts 102 and heaters 110 can be placed on top of the motherboard 114. The motherboard 114, with its networks of channels 116, holes 118, depressions 120, is structured and arranged to form connections with many types and sizes of components. The different components 102, 104, 106, 108, 110 and 112 and how they can be connected to the motherboard 114 are described in detail below with respect to FIGS. 3-13.

Figure 2A:
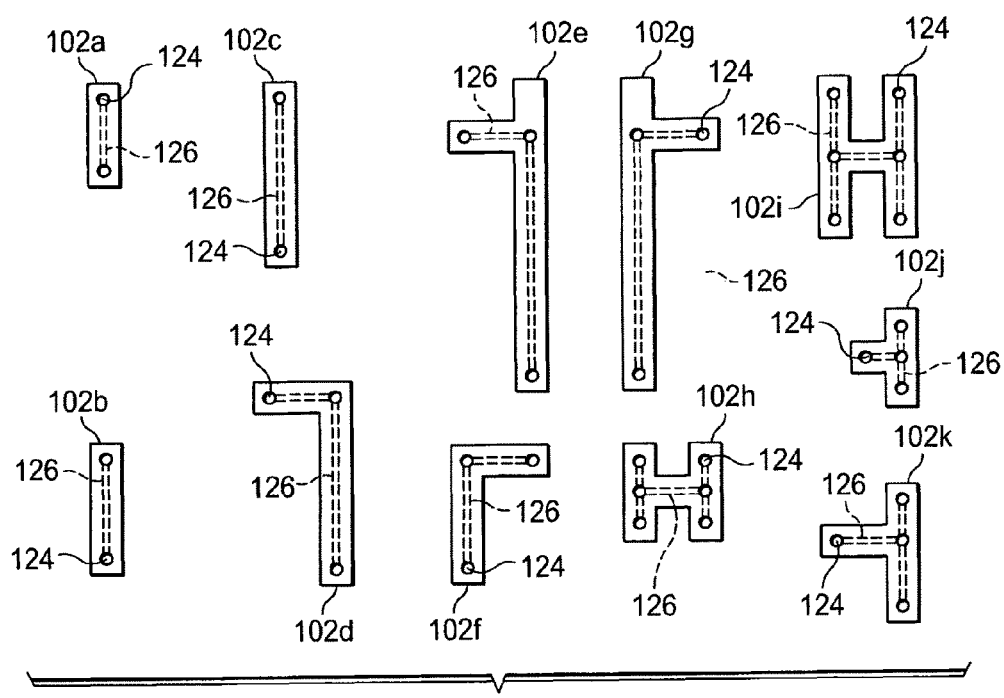
FIGS. 2A-2D illustrate a wide-variety of channel inserts which have different sizes and shapes that can be used to build the modular microfluidic device in accordance with embodiments of the present invention.
Figure 2B:
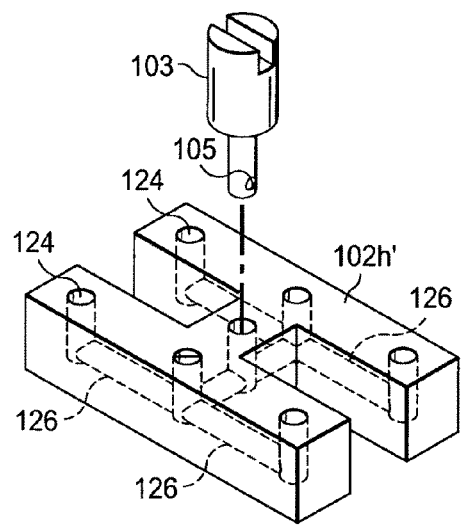

Referring to FIGS. 2A-2B, there are illustrated a wide-variety of channel inserts 102 having different sizes and shapes which can be used to help build the modular microfluidic device 100 in accordance with embodiments of the present invention. As shown in FIG. 2A, the channel inserts 102 can be transparent (shown) or non-transparent (not shown) and have a wide-variety of sizes and shapes where only a representative few have been shown and described herein. The exemplary channel inserts 102 shown include: (1) a short straight channel insert 102a (e.g., 1.5 mm (wide)×2 mm (thick)×4 mm (long); (2) a medium straight channel insert 102b, (3) a long straight channel insert 102c; (4) a short left-turn channel insert 102d; (5) a long left-turn channel insert 102e; (6) a short right-turn channel insert 102f; (7) a long right-turn channel insert 102g; (8) a small H-shaped channel insert 102h; (9) a large H-shaped channel insert 102i; (10) a small T-shaped channel insert 102j; and (11) a large T-shaped channel insert 102k. Each channel insert 102a, 102b . . . 102k has at least two openings 124 and a channel 126 formed therein through which flows a small amount of fluid. For the purposes of this disclosure, the term "fluid" means liquid or gas which can flow through embodiments of the microfluidic system of the present invention. The user selects and places the desired channel inserts 102a, 102b . . . 102k within the interconnect channels 116 of the motherboard 114 when building the modular microfluidic system 100. In another embodiment, the channel inserts 102 may also have one or more openings 124 located on their ends instead of tops as will be discussed below with respect to FIGS. 7-9.

Figure 2C:
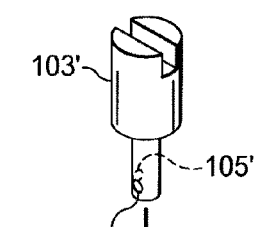
Figure 2D:
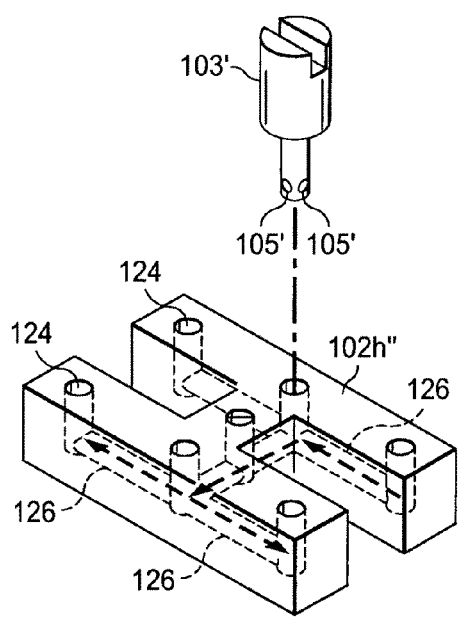

In one embodiment, the channel insert 102 can incorporate a turn valve 103 that can be controlled to allow or prevent the flow of a fluid within a channel 126. For example, FIG. 2B illustrates a turn valve 103 (an on/off turn valve with a straight channel 105) located within a small H-shaped channel insert 102h'. And, FIGS. 2C-2D illustrate another type of turn valve 103' (a 90° turn valve with a L-shaped channel 105') located within a small H-shaped channel insert 102*h*". In FIG. 2C, the turn valve 103' is in one position where the fluid can travel one way through the small H-shaped channel insert 102*h*" (flow direction indicated by arrow in drawing). In FIG. 2D, the turn valve 103' is in another position where the fluid can travel another way through the small H-shaped channel insert 102*h*" (flow direction indicated by arrow in drawing). Of course, the channel inserts 102 can incorporate a wide-range of different valves.

Referring to FIG. 3, there are illustrated different types of micromodules 106 (or microchip modules 106) which can be used to help build the modular microfluidic device 100 in accordance with embodiments of the present invention. The micromodules 106 can be transparent (shown) or non-transparent (not shown). For example, the micromodules 106 that can be used to help build the modular microfluidic device 100 include: (1) a mixing module 106*a* (which is used to mix sample fluids); (2) a detection chamber micromodule 106*b* (which is used as a biosensor); (3) a reaction micromodule 106*c* (which can be heated, cooled and evacuated, and is used to allow chemical or biological reactions(s), cell culture or molecule amplification(s) such as polymerase chain reaction); and (4) an electrophoresis micromodule 106*d* (which is used to separate molecules). Each micromodule 106*a*, 106*b* . . . 106*d* has at least two openings 128 and a channel 130 formed therein through which flows a small amount of fluid (see FIG. 10 for cross-sectional side view of the exemplary reaction micromodule 106*c*). The micromodules 106*a*, 106*b* . . . 106*d* in addition to having different functions and can have different sizes and shapes (see FIG. 1B). For example, the microdules 106*a*, 106*b* . . . 106*d* can be any thickness (e.g., 2 mm) and have dimensions of 7.5 mm×7.5 mm, 16.5 mm×16.5 mm, 7.5 mm×16.5 mm, 25.5 mm×25.5 mm, and 34.5 mm×34.5 mm. It should be appreciated that different micromodules 106 which have various applications and functions could be fabricated and used in this plug-n-play microfluidic system 100. For example, some alternative micromodules 106 that could be fabricated and used in this plug-n-play microfluidic system 100 include a filtering micromodule (which is used to filter sample fluid(s)), a separation micromodule (which is used to separate sample fluid(s)), a heating micromodule (which has an internal heater to heat sample fluid(s)), a valve micromodule (which is used to direct and stop sample fluids(s)) a pump micromodule (which has an internal pump to pump sample fluid(s)), a pump-valve micromodule (which is used to both pump sample fluid(s) and direct or stop sample fluid(s)), and an isolation micromodule (which is used to isolate sample fluid(s)), or combinations of these.

Figure 4A:
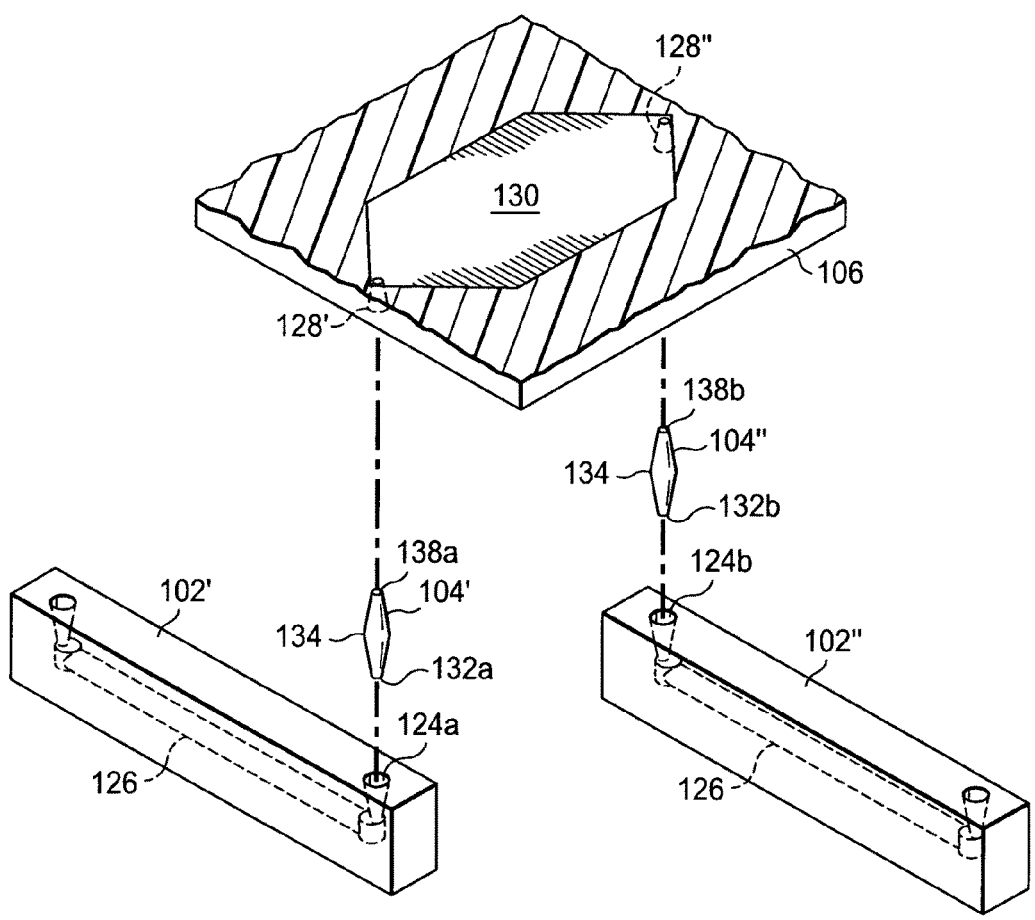

Referring to FIGS. 4A-4C, there are illustrated three drawings which are used to help explain how one micromodule 106 can be connected to two fitting components 104' and 104" which are connected two channel inserts 102' and 102" in accordance with one embodiment of the present invention. FIG. 4A is a perspective view illustrating the micromodule 106 disconnected from two fitting components 104' and 104" and the two channel inserts 102' and 102". FIG. 4B is a cross-sectional view illustrating the micromodule 106, the two fitting components 104' and 104" and the two channel inserts 102' and 102" prior to them being connected to one another. In this example, the micromodule 106 has two holes 128' and 128" (e.g., female luer fittings 128' and 128", female luer lock fittings 128' and 128") formed therein which are in fluid communication with the interior chamber 130. Each fitting component 104' and 104" has a first end 132*a* and 132*b* (e.g., male luer fitting 132*a* and 132*b*, male luer lock fitting 132*a* and 132*b*), a tube 134 (e.g., flexible tubing 134) and a second end 138*a* and 138*b* (e.g., male luer fitting 138*a* and 138*b*, male luer lock fitting 138*a* and 138*b*). Plus, each channel insert 102' and 102" has two openings 124*a* and 124*b* (e.g., female luer fittings 124*a* and 124*b*, female luer lock fittings 124*a* and 124*b*) and the channel 126 formed therein (e.g., the channel 126 is shown herein to be circular but it could by any geometrical shape). In embodiments, the micromodule 106 has holes 128' and 128" configured to receive the first ends 138*a* and 138*b* of the two fitting components 104' and 104" which have second ends 132*a* and 132*b* configured to plug into the holes 124*a* and 124*b* of the two channel inserts 102' and 102". FIG. 4C is a cross-sectional view illustrating the micromodule 106, the two fitting components 104' and 104" and the two channel insert 102' and 102" connected such that fluid can pass from one channel insert 102' into one fitting component 104' through the micromodule 106 into the other fitting component 104" and then into the other channel insert 102". If desired, the micromodule 106 can be connected in parallel with one of the channel inserts 102 in which case the fluid would flow within both the micromodule 106 and the channel insert 102.

Figure 5A:
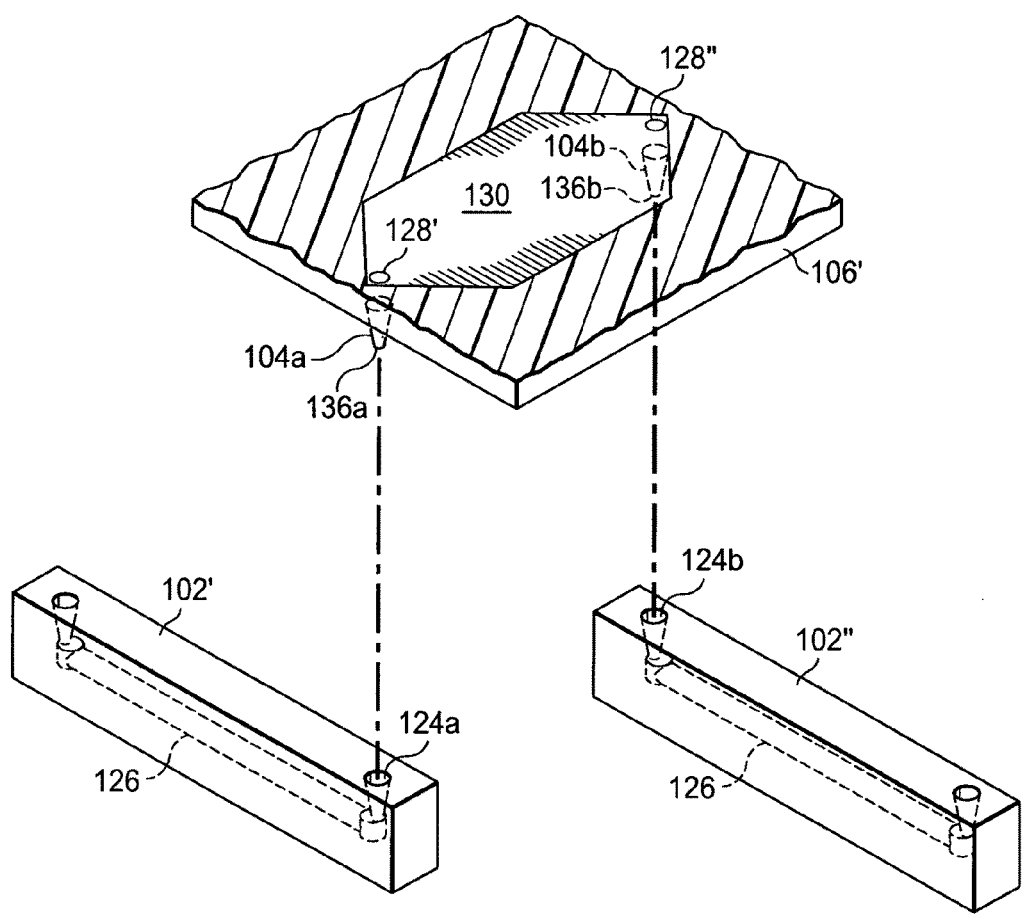

Referring to FIGS. 5A-5C, there are illustrated three drawings which are used to help explain how one micromodule 106', in this case a reaction chamber, can have two integral fitting components 104*a* and 104*b* which can be connected to two channel inserts 102' and 102" in accordance with another embodiment of the present invention. FIG. 5A is a perspective view illustrating the micromodule 106' disconnected from the two channel inserts 102' and 102". FIG. 5B is a cross-sectional view illustrating the micromodule 106' and the two channel insert 102' and 102" prior to them being connected to one another. In this example, the micromodule 106' has the interior channel 130 and the two integral fitting components 104*a* and 104*b* each of which with an exposed end 136*a* and 136*b* (e.g., male luer fittings 136*a* and 136*b*, male luer lock fittings 136*a* and 136*b*). Plus, each channel insert 102' and 102" has two openings 124*a* and 124*b* (e.g., female luer fittings 124*a* and 124*b*, female luer lock fittings 124*a* and 124*b*) and the channel 126 formed therein. In embodiments, the micromodule 106' has integrated therein the first ends of the fitting components 104*a* and 104*b* which also have second ends 136*a* and 136*b* configured to plug into the holes 124*a* and 124*b* in the channel inserts 102' and 102". FIG. 5C is a cross-sectional view illustrating the micromodule 106' with the two integral fitting components 104*a* and 104*b* connected to the two channel insert 102' and 102" such that fluid can pass from one channel insert 102' into one integral fitting component 104*a* through the channel 130 of the micromodule 106' into the other integral fitting component 104*b* and then into the other channel insert 102".

Figure 6A:
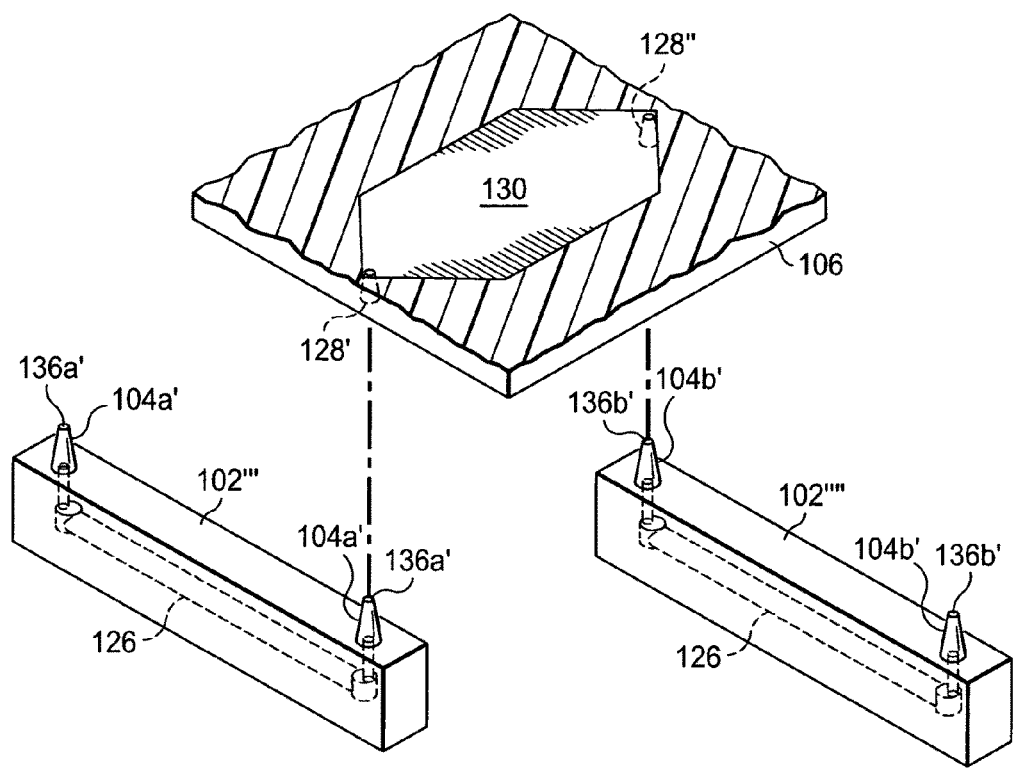

Referring to FIGS. 6A-6C, there are illustrated three drawings which are used to help explain how one micromodule 106 can be connected to two channel inserts 102'" and 102'" which have integral fitting components 104*a*' and 104*b*' in accordance with another embodiment of the present invention. FIG. 6A is a perspective view illustrating the micromodule 106 disconnected from the two channel inserts 102'" and 102"". FIG. 6B is a cross-sectional view illustrating the micromodule 106 and the two channel insert 102'" and 102"" prior to them being connected to one another. In this example, the micromodule 106 has two holes 128' and 128" (e.g., female luer fittings 128' and 128", female luer lock fittings 128' and 128") formed therein which are in fluid communication with the interior chamber 130. Each channel insert 102'" and 102"" has a channel 126 formed therein plus two integral fitting components 104*a*' and 104*b*' each of which with an exposed end 136*a*' and 136*b*' (e.g., male luer fittings 136*a*' and 136*b*', male luer lock fittings 136*a*' and 136*b*'). In embodiments, the channel insert 102''' and 102'''' have integrated therein the first ends of the fitting components 104*a*' and 104*b*' which also have second ends 136*a* and 136*b* configured to plug into the holes 128' and 128'' in the micromodule 106. FIG. 6C is a cross-sectional view illustrating the micromodule 106 connected to the two channel insert 102''' and 102'''' such that fluid can pass from one channel insert 102''' into one integral fitting component 104*a*' through the micromodule 106 into the other integral fitting component 104*b*' and then into the other channel insert 102''''.

Figure 7:
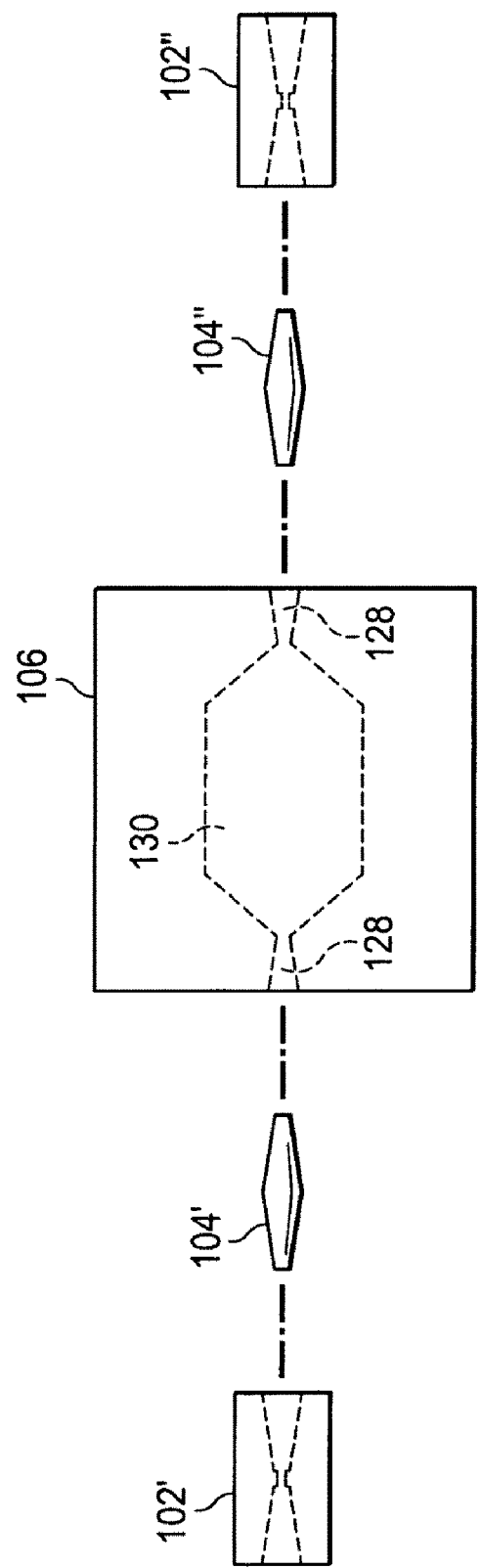
FIGS. 7-9 illustrate three drawings which are used to help explain three different ways one micromodule can be connected to two channel inserts which have openings in their ends as opposed to their tops in accordance with a few more embodiments of the present invention.
Figure 8:
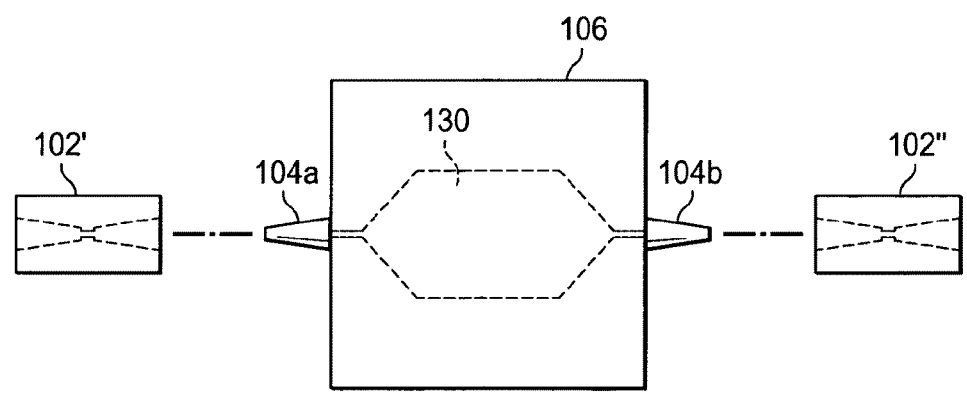
Figure 9:
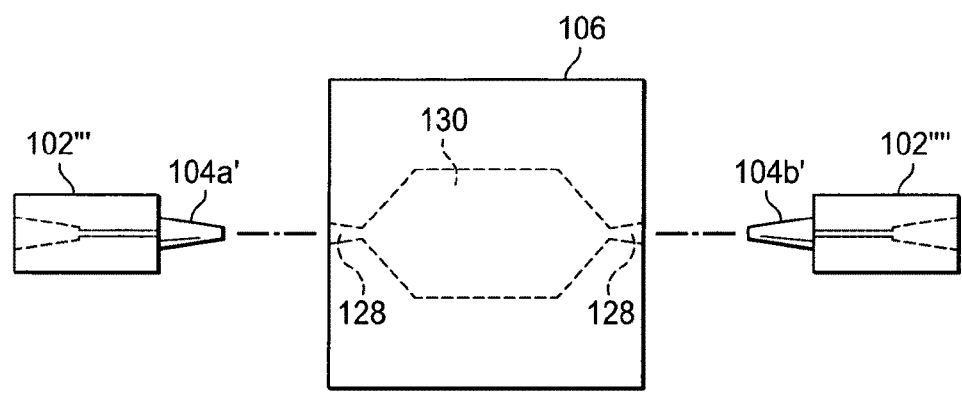

Referring to FIGS. 7-9, there are illustrated three drawings which are used to indicate three different ways one micromodule 106 can be connected to two channel inserts 102 which have openings 124 in their ends as opposed to their tops in accordance with a few more embodiments of the present invention. FIG. 7 is a top view illustrating the micromodule 106 (which has two openings 128 in its side as opposed to its bottom surface as described above in FIGS. 4A-4C) disconnected from two fitting components 104' and 104'' and the two channel inserts 102' and 102''. FIG. 8 is a top view illustrating the micromodule 106 (which has two integral fitting components 104*a* and 104*b* in its side as opposed to its bottom surface as described above in FIGS. 5A-5C) disconnected from two channel inserts 102' and 102''. FIG. 9 is a top view illustrating the micromodule 106 (which has two openings 128 in it's side as opposed to it's bottom surface as described above in FIGS. 6A-6C) disconnected from two channel inserts 102''' and 102''' which have integral fitting components 104*a*' and 104*b*'. In each of these embodiments, the micromodules 106 would be in fluid communication with their respective channel inserts 102 when all the parts are connected to one another via the fitting components 104. Plus, the grooves 116 and/or depressions 120 in the motherboard 114 may need to be adjusted when assembling components side by side as discussed above.

If any of the channel inserts 102, the fitting components 104 and/or the micromodules 106 use luer fittings or luer lock fittings to connect to one another then those luer fittings could have the standard 6% luer taper. If desired to form leak-proof connections, one can add a few drops of pre-cured polymer such as pre-cured polydimethysiloxane (PDMS) to the fittings before attaching any two components 102, 104 and 106. The advantage of the addition of the pre-cured polymer is that after it is cured, it will seal off any gaps that may be present due to imperfections of the fitting fabrication and prevent any fluid leakage. Thus, the tolerance of the fitting fabrication can be reduced with the addition of the pre-cured polymer. Also, since it is not a permanent process, the components 102, 104 and 106 can be easily separated and reused. Adhesive or similar water proof materials could be used instead of the pre-cured polymer as long as the materials do not permanently attach the components 102, 104 and. 106 and the adhesive materials can be easily removed. It should be appreciated that a wide variety of fitting shapes such as barbed fittings and taper shaped fittings can be used in the present invention. All the proof-of-concept experiments conducted for the present invention did not use pre-cured polymer or adhesive or water proof materials (see FIGS. 14-17).

Figure 10B:
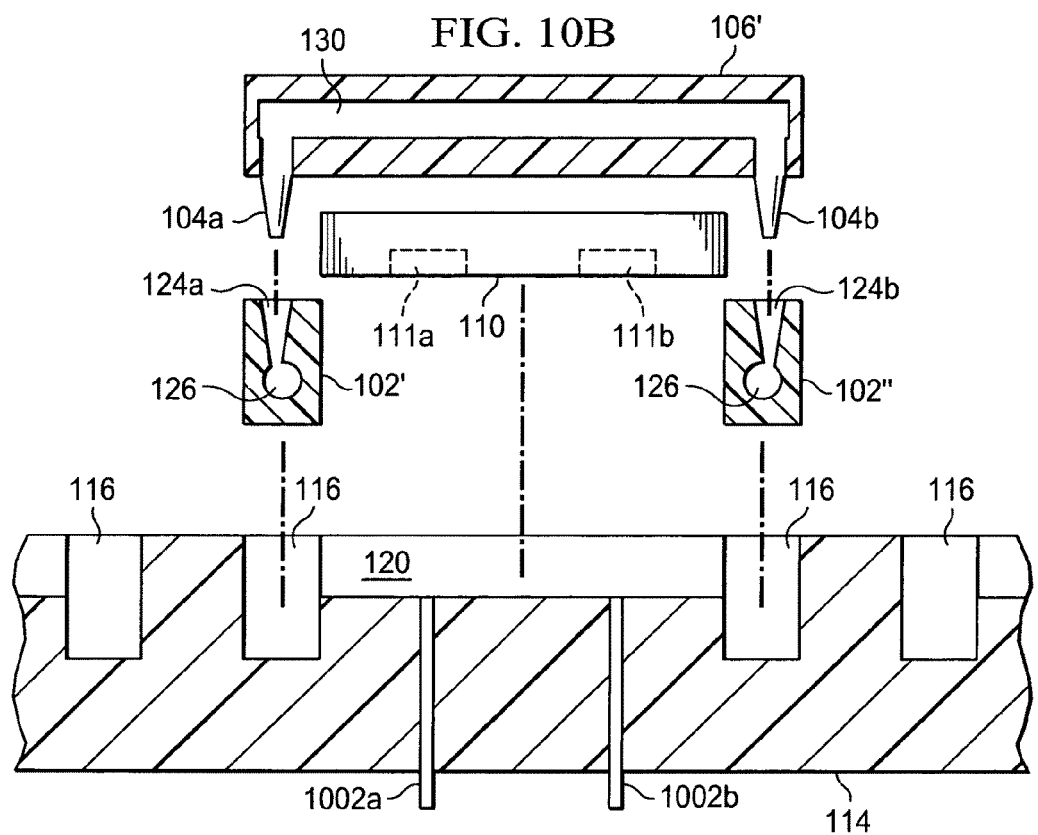
Figure 10C:
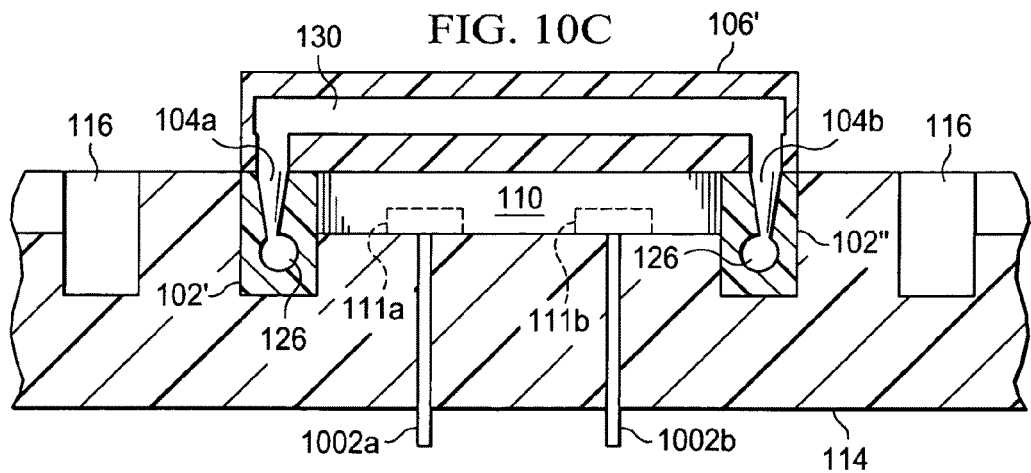

Referring to FIGS. 10A-10C, there are illustrated three drawings which are used to help explain how one micromodule 106' (with integral fitting components 104*a* and 104*b*), two channel inserts 102' and 102'' and one heater 110 can be attached to the motherboard 114 in accordance with embodiments of the present invention. FIG. 10A is a perspective view illustrating the micromodule 106' and two channel inserts 102' and 102'' attached to the motherboard 114 (note: the integral fitting components 104*a* and 104*b* and the heater 110 can not be seen). FIG. 10B is a cross-sectional view illustrating the micromodule 106' (with integral fitting components 104*a* and 104*b*), the two channel inserts 102' and 102'', and the heater 110 prior to them being connected to one another and attached to the motherboard 114. In this example, the motherboard 114 has two integral electrical connectors 1002*a* and 1002*b* which extend into the depression 120 and will be used to supply electrical power to the heater 110 via electrical contacts 111*a* and 111*b*. FIG. 10C is a cross-sectional view illustrating the micromodule 106' (with integral fitting components 104*a* and 104*b*), the two channel inserts 102' and 102'' and the heater 110 connected to one another and attached to the motherboard 114. The heater 110 is positioned below the micromodule 106' and supplies heat to the micromodule 106'. If desired, thermal grease or adhesive can be used to temporarily attach the heater 110 to the bottom of the micromodule 106' to ensure that there is a good thermal conduct between the heater 110 and the micromodule 106'. As can be seen, the micromodule 106' (with integral fitting components 104*a* and 104*b*) and the two channel inserts 102' and 102'' are connected to one another such that fluid can pass from one channel insert 102' into one fitting component 104*a* through the internal chamber 130 of the micromodule 106' into the other fitting component 104*b* and then into the other channel insert 102''. Alternatively, instead of externally heating the micromodule 106 it could be internally heated by using an integrated heater.

Figure 11A:
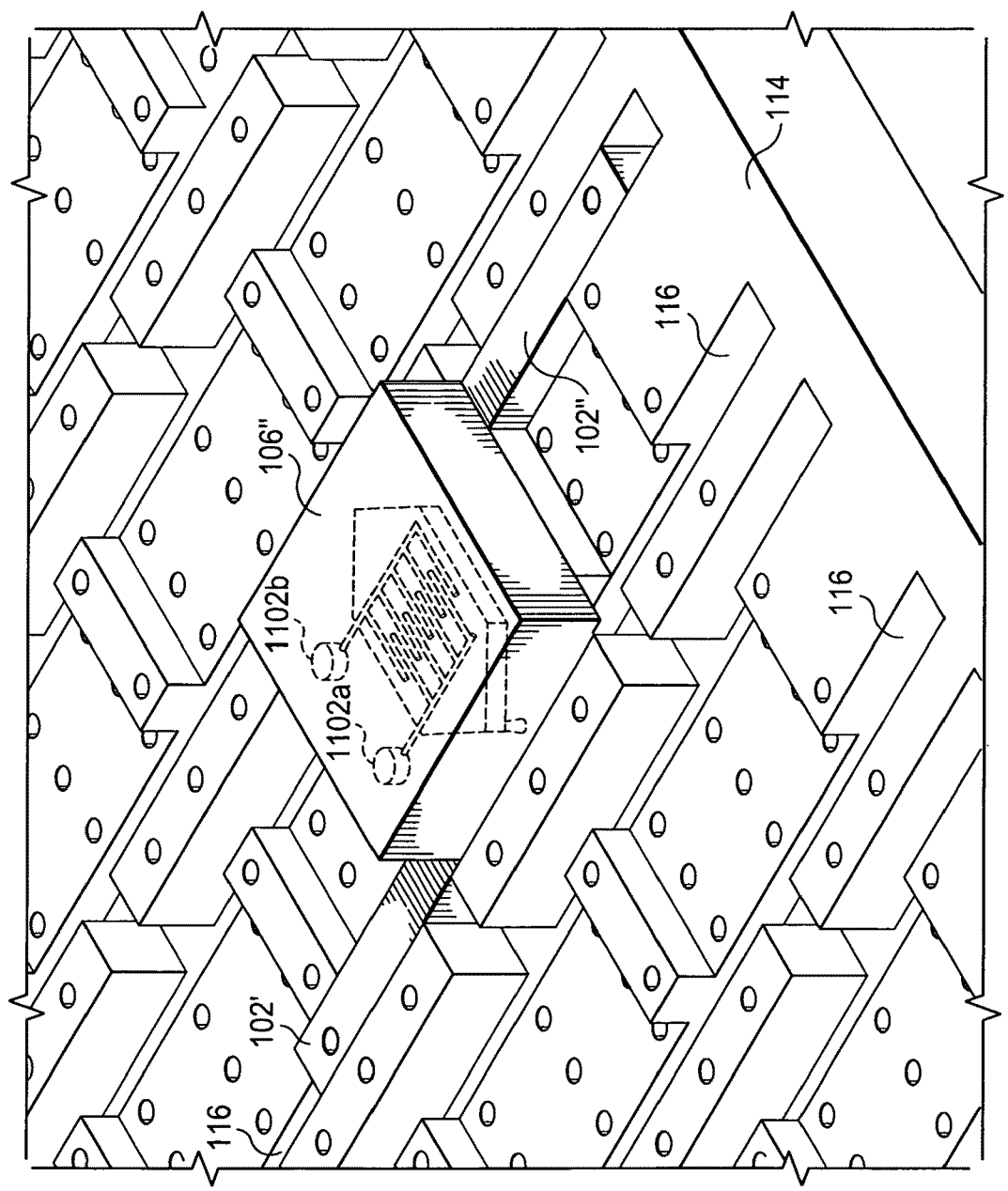
Figure 11C:
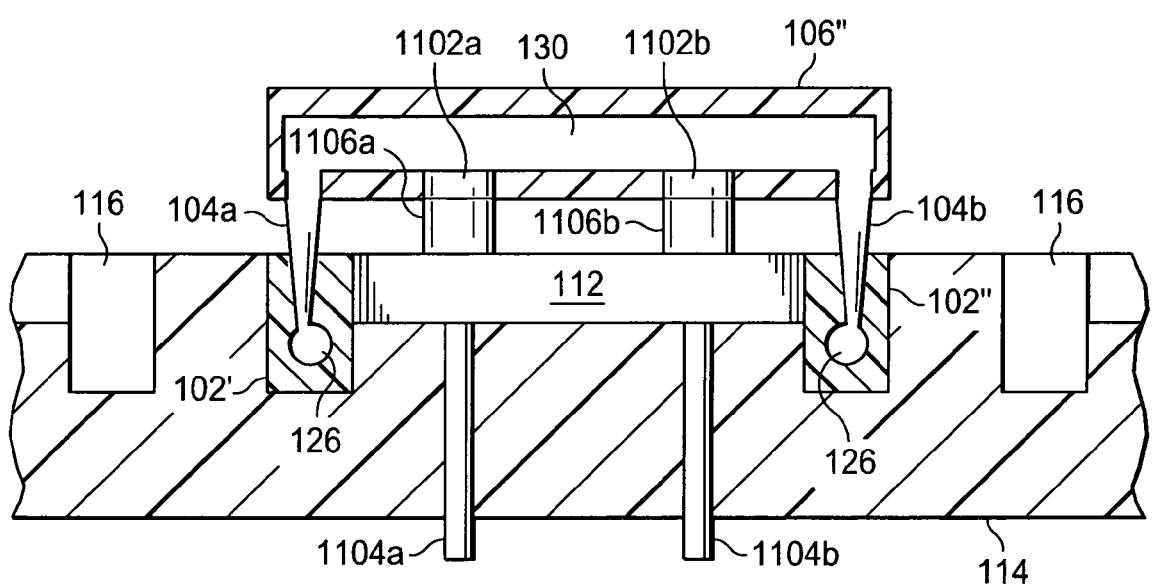

Referring to FIGS. 11A-11C, there are illustrated three drawings which are used to help explain how one micromodule 106'' (with integral fitting components 104*a* and 104*b*), two channel inserts 102' and 102', and one electrical contact unit 112 can be attached to the motherboard 114 in accordance with embodiments of the present invention. FIG. 11A is a perspective view illustrating the micromodule 106'' (which has two electrical pads 1102*a* and 1102*b*) and two channel inserts 102' and 102'' attached to the motherboard 114 (note: in this example the micromodule 106'' has a detection chamber which could enable electrochemical detection tests). FIG. 11B is a cross-sectional view illustrating the micromodule 106'' (with integral fitting components 104*a* and 104*b*), the two channel inserts 102' and 102'', and the electrical contact unit 112 prior to them being connected to one another and attached to the motherboard 114. In this example, the motherboard 114 has two holes 118*a* and 118*b* through which will pass two electrical electrodes 1104*a* and 1104*b* that are connected to the electrical contact unit 112. The electrical contact unit 112 also has two electrical contacts 1106*a* and 1106*b* which will connect to the two electrical pads 1102*a* and 1102*b* on the micromodule 106''. The electrical contact unit 112 is sized to fit within the depression 120 of the motherboard 114. FIG. 11C is a cross-sectional view illustrating the micromodule 106'' (with integral fitting components 104*a* and 104*b*), the two channel inserts 102' and 102'' and the electrical contact unit 112 connected to one another and attached to the motherboard 114. The electrical contact unit 112 is positioned below the micromodule 106'' and supplies electricity to the micromodule 106'' or alternatively measures electrical signals from the micromodule 106'' (note: if desired the electrical contact unit 112 may have electrical contact pads on its bottom which contact integrated electrodes within the motherboard 114). As can be seen, the micromodule 106'' (with integral fitting components 104*a* and 104*b*) and the two channel inserts 102' and 102'' are connected to one another such that fluid can pass from one channel insert 102' into one fitting component 104*a* through the micromodule 106'' into the other fitting component 104b and then into the other channel insert 102''. The electrical contact unit may have integrated electrodes (or holes for electrodes to pass) and the electrical contact unit may provide electronic connections to external data acquisition and system control devices.

Figure 12A:
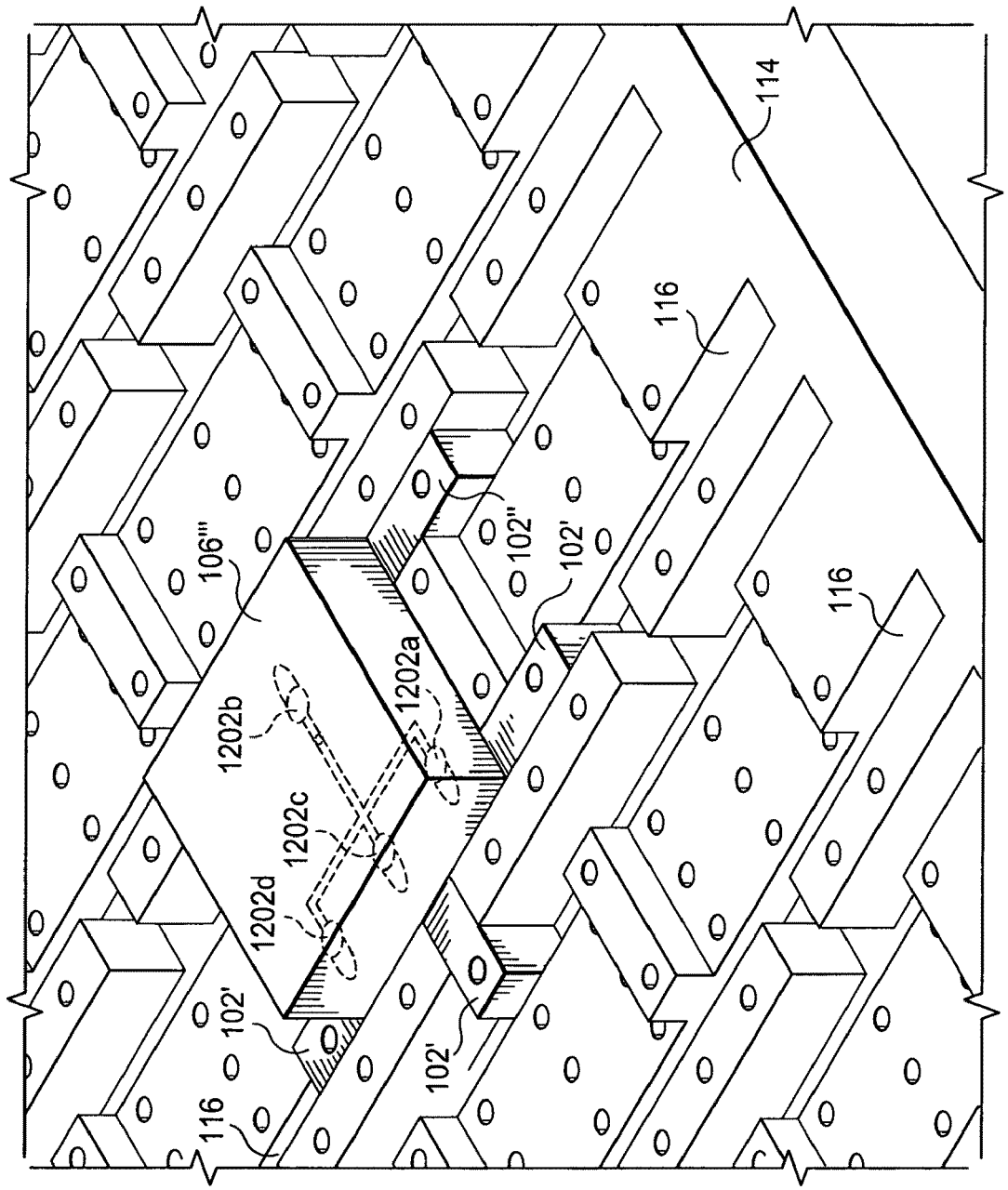
Figure 12C:
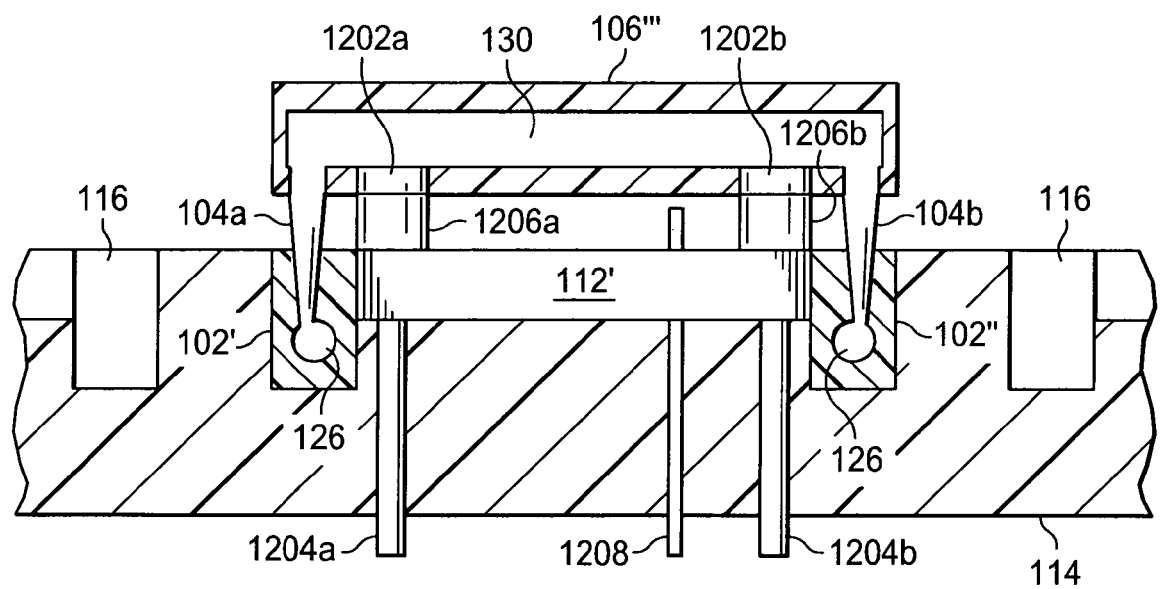

Referring to FIGS. 12A-12C, there are illustrated three drawings which are used to help explain how one micromodule 106''' (with integral fitting components 104a and 104b), four channel inserts 102' (three shown) and 102'' (one shown), and one electrical contact unit 112' can be attached to the motherboard 114 in accordance with embodiments of the present invention. FIG. 12A is a perspective view illustrating the micromodule 106''' (which has four electrical pads 1202a, 1202b, 1202c and 1202d) attached to the motherboard 114 (note: in this example the micromodule 106''' has a chamber which enables electrophoresis tests). FIG. 12B is a cross-sectional view illustrating the micromodule 106''' (with integral fitting components 104a and 104b), two channel inserts 102' and 102'', and the electrical contact unit 112' prior to them being connected to one another and attached to the motherboard 114. In this example, the motherboard 114 has four holes 118a and 118b (two shown) through which will pass four electrical electrodes 1204a and 1204b (two shown) that are connected to the electrical contact unit 112'. The electrical contact unit 112' also has four electrical contacts 1206a and 1206b (two shown) which will respectively connect to the four electrical pads 1202a, 1202b, 1202c and 1202d on the micromodule 106''' (see FIG. 12A). Moreover, the electrical contact unit 112' has a hole through which an optical fiber 1208 could pass and interface with the micromodule 106'''. The motherboard 114 also has another hole 118e through which the optical fiber 1208 can pass and be connected to an external device where for example the optical fiber 1208 can be used for fluorescent detection. The electrical contact unit 112' is sized to fit within the depression 120 of the motherboard 114. In alternate embodiments, the modules may not be sized to fit within depressions of the motherboard, but may be stacked on top of the motherboard, or may be assembled in the absence of a motherboard. FIG. 12C is a cross-sectional view illustrating the micromodule 106''' (with integral fitting components 104a and 104b), the two channel inserts 102' and 102'' and the electrical contact unit 112' connected to one another and attached to the motherboard 114. The electrical contact unit 112' is positioned below the micromodule 106''' and supplies electricity to the micromodule 106''' (note: if desired the electrical contact unit 112' may have electrical contact pads on its bottom which contact integrated electrodes within the motherboard 114). As can be seen, the micromodule 106''' (with integral fitting components 104a and 104b) and the four channel inserts 102' (three shown) and 102'' (one shown) are connected such that fluid can pass via an electrokinetic and/or electroosmotic flow from three channel inserts 102' into three fitting components 104a through the micromodule 106''' and into another fitting component 104b and then into the other channel insert 102''.

Figure 13A:
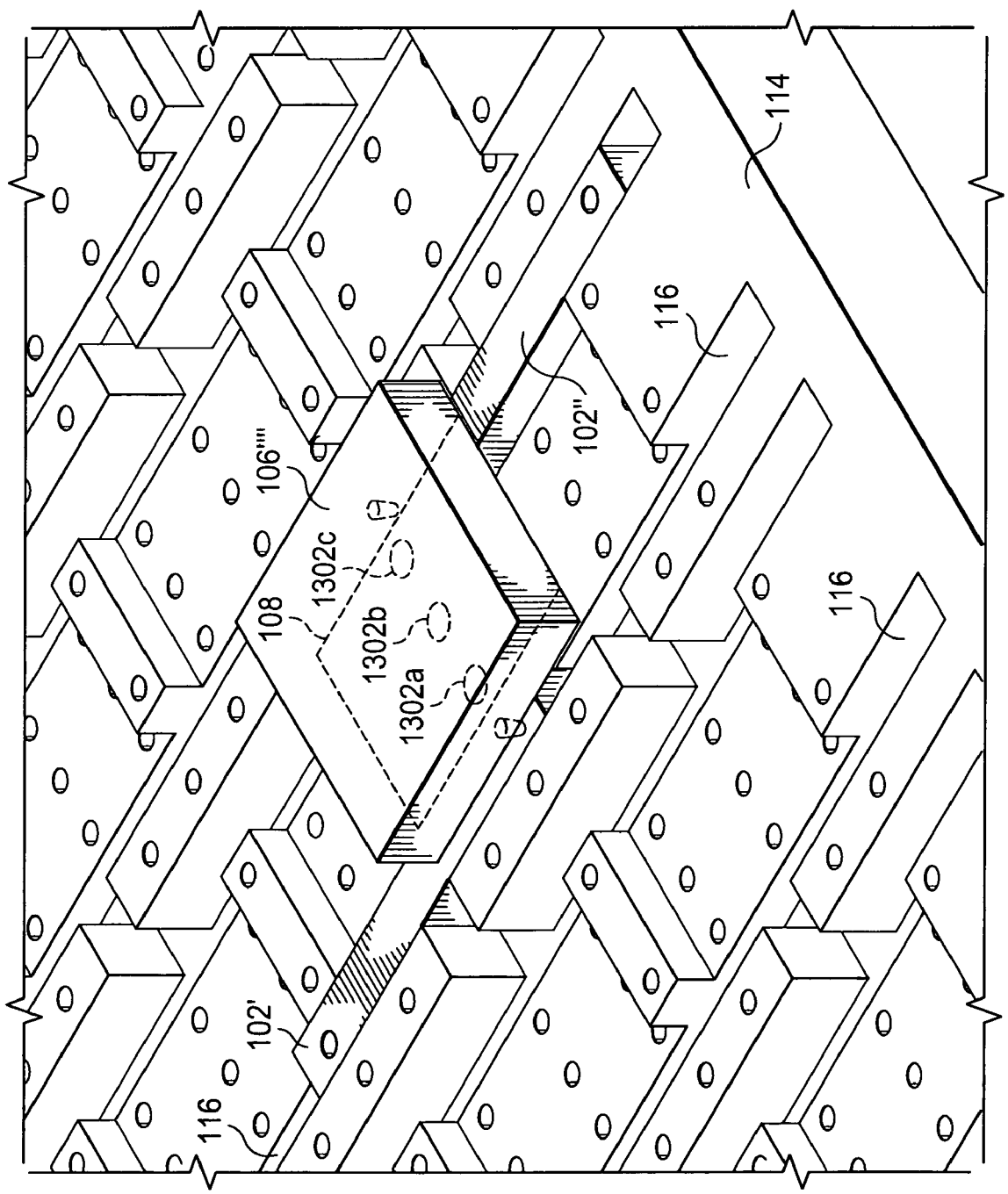
Figure 13G:
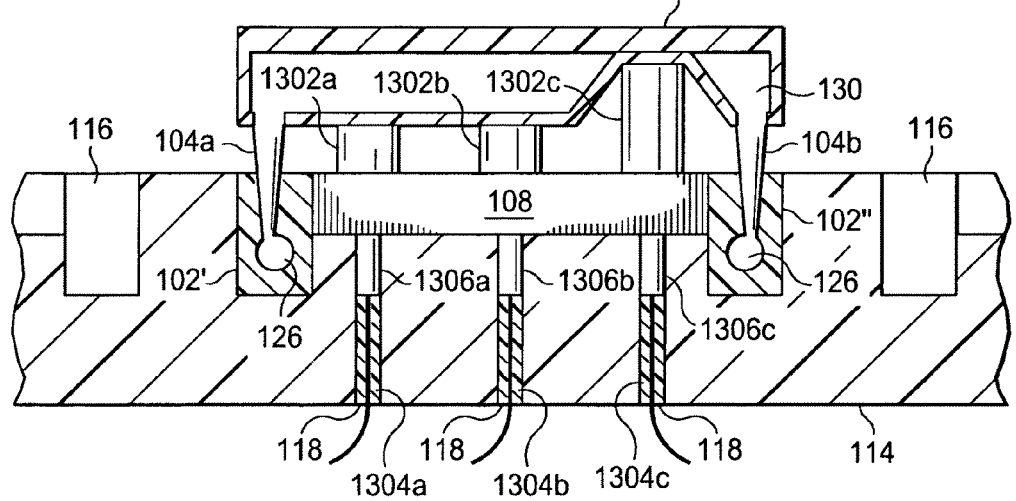
Figure 13H:
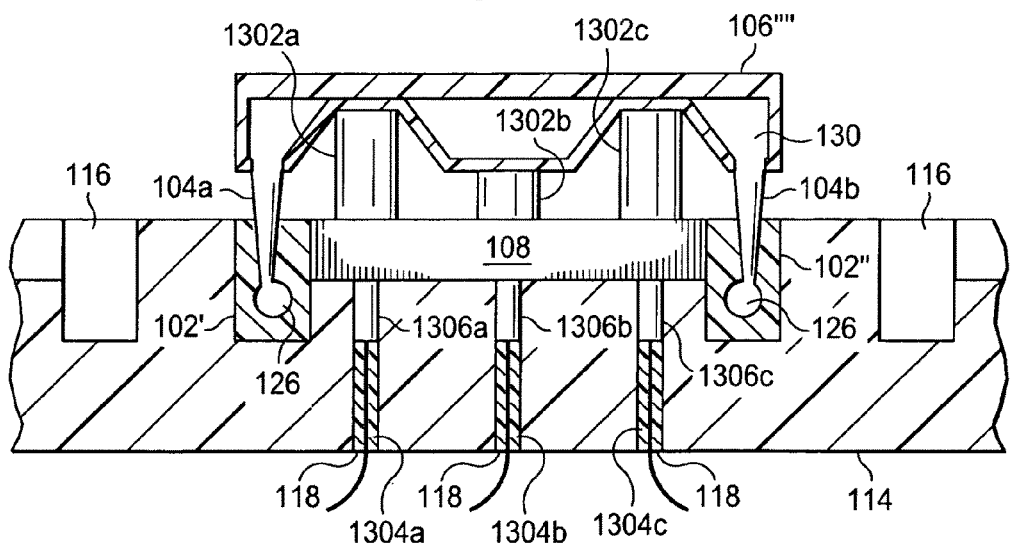

Referring to FIGS. 13A-13C, there are illustrated three drawings which are used to help explain how one micromodule 106'''' (with integral fitting components 104a and 104b), two channel inserts 102' and 102'', and one actuator 108 can be attached to the motherboard 114 in accordance with embodiments of the present invention. FIG. 13A is a perspective view illustrating the micromodule 106'''' and beneath it the actuator 108 (which has three pistons 1302a, 1302b and 1302c) both the micromodule 106 and the actuator 108 are attached to the motherboard 114. FIG. 13B is a cross-sectional view illustrating the micromodule 106'''' (with integral fitting components 104a and 104b), the two channel inserts 102' and 102', and the actuator 108 prior to them being connected to one another and attached to the motherboard 114. In this example, the motherboard 114 has three integral electrical connectors 1304a, 1304b and 1304c which supply electrical power to the actuator 108. The exemplary actuator 108 has three electrodes 1306a, 1306b and 1306c which will contact the three integral electrical connectors 1304a, 1304b and 1304c in the motherboard 114. Alternatively, the motherboard 114 could have three channels 118 through which could pass the three electrodes 1306a, 1306b and 1306c of the actuator 108. The actuator 108 is sized to fit within the depression 120 of the motherboard 114. FIG. 13C is a cross-sectional view illustrating the micromodule 106'''' (with integral fitting components 104a and 104b), the two channel inserts 102' and 102'' and the actuator 108 connected to one another and attached to the motherboard 114. As can be seen, the micromodule 106'''' (with integral fitting components 104a and 104b) and the two channel inserts 102' and 102' are connected to one another such that fluid can pass from one channel insert 102' into one fitting component 104a through the internal channel 130 for the micromodule 106'''' into the other fitting component 104b and then into the other channel insert 102''. The actuator 108 has been shown in a configuration that allows fluid to flow in either direction within the micromodule 106''''. However, the actuator 108 can be used to pump the fluid through the micromodule 106'''' in either direction or it could be used as a valve to prevent the flow of the fluid through the micromodule 106''''. Examples of the actuator 108 pumping and valving fluid within the micromodule 106'''' which has a flexible bottom are discussed next with respect to FIGS. 13D-13K.

FIGS. 13D-13I are used to help explain how the actuator 108 can pump fluid from left to right within the micromodule 106''''. First, the actuator 108 would be controlled such that the left piston 1302a is raised to block the flow of fluid within a channel 130 in the micromodule 106'''' (see FIG. 13D). Then, the actuator 108 is controlled such that both the left piston 1302a and middle piston 1302b are raised to pump the fluid from left to right in the channel 130 within the micromodule 106'''' (see FIG. 13E). Next, the actuator 108 is controlled such that the left piston 1302a is lowered and the middle piston 1302b and the right piston 1302c are both raised to further pump the fluid from left to right in the channel 130 within the micromodule 106'''' (see FIG. 13F). Thereafter, the actuator 108 is controlled such that the left piston 1302a and middle piston 1302b are lowered and the right piston 1302c is raised to allow more fluid to enter the channel 130 within the micromodule 106'''' (see FIG. 13G). The actuator 108 is then controlled such that the left piston 1302a and the right piston 1302c are raised to force the fluid in the middle section of the channel 130 within the micromodule 106'''' (see FIG. 13H). Thereafter, the actuator 108 is controlled such that the left piston 1302a and the middle piston 1302b are raised and the right piston 1302c is lowered to pump the fluid from left to right in the channel 130 within the micromodule 106'''' (see FIG. 13I). Thus, it can be appreciated that the actuator 108 can be controlled so as to raise and lower the pistons 1302a, 1302b and 1302c in a sequence similar to a peristalic pump and pump the fluid in any desired direction within the channel 130 within the micromodule 106''''.

Figure 13K:
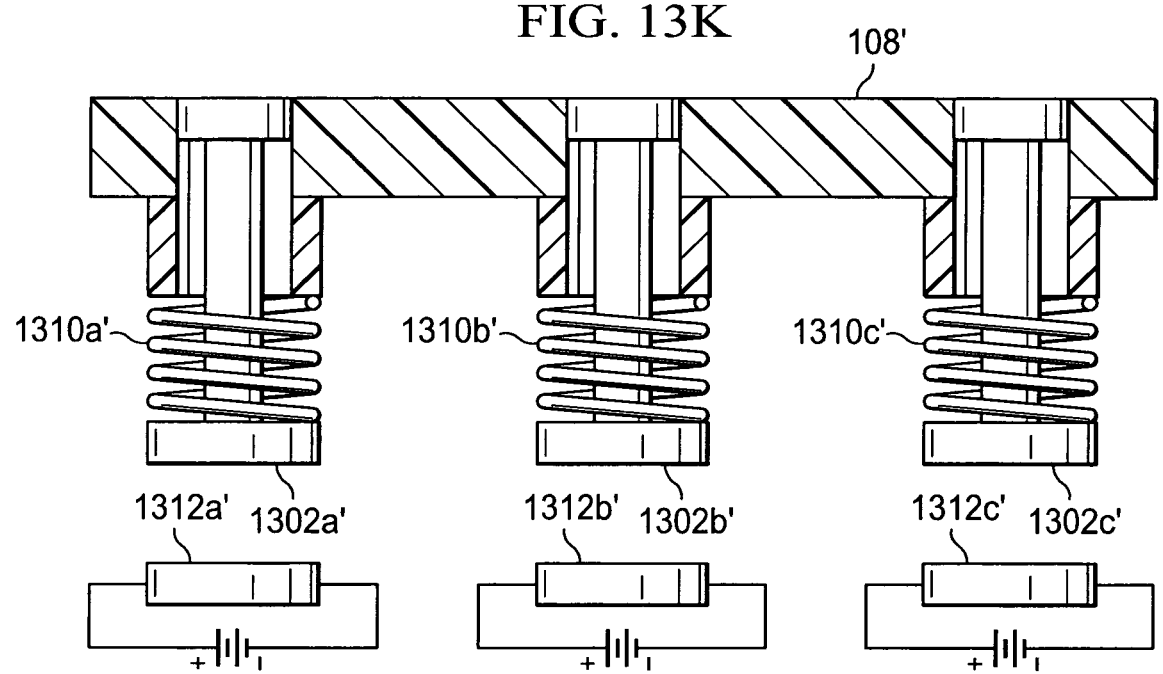

FIG. 13J is used to help explain how the actuator 108 can prevent the flow of fluid within the micromodule 106''''. In embodiments, the actuator 108 would be controlled such that the middle piston 1302b is raised to block the flow of fluid within a channel 130 in the micromodule 106''''. Of course, the actuator 108 if desired could be controlled such that anyone or any combination of the pistons 1302a, 1302b and 1302c could be raised to block the flow of fluid within a channel 130 in the micromodule 106''''. FIG. 13K is a diagram of an exemplary actuator 108' that has three pistons 1302a', 1302b' and 1302c' each of which include a spring 1310a', 1310b' and 1310c' that are compressed by controlling the operation of solenoids 1312a', 1312b' and 1312c'. Also, it should be appreciated that the three pistons 1302a', 1302b' and 1302c' can be compressed by a wide-range of alternative methods including, for example, air pressure which can be provided through holes 118 in the motherboard 114. If desired, commercially available micropumps could be used and attached to the motherboard 114 or placed next to the motherboard 114. Examples of commercially available micropumps include pumps that are manufactured by Bartels Mikrotechik GmbH, Star Micronica Co., Ltd, and Takasago Electric, Inc.

Figure 14:
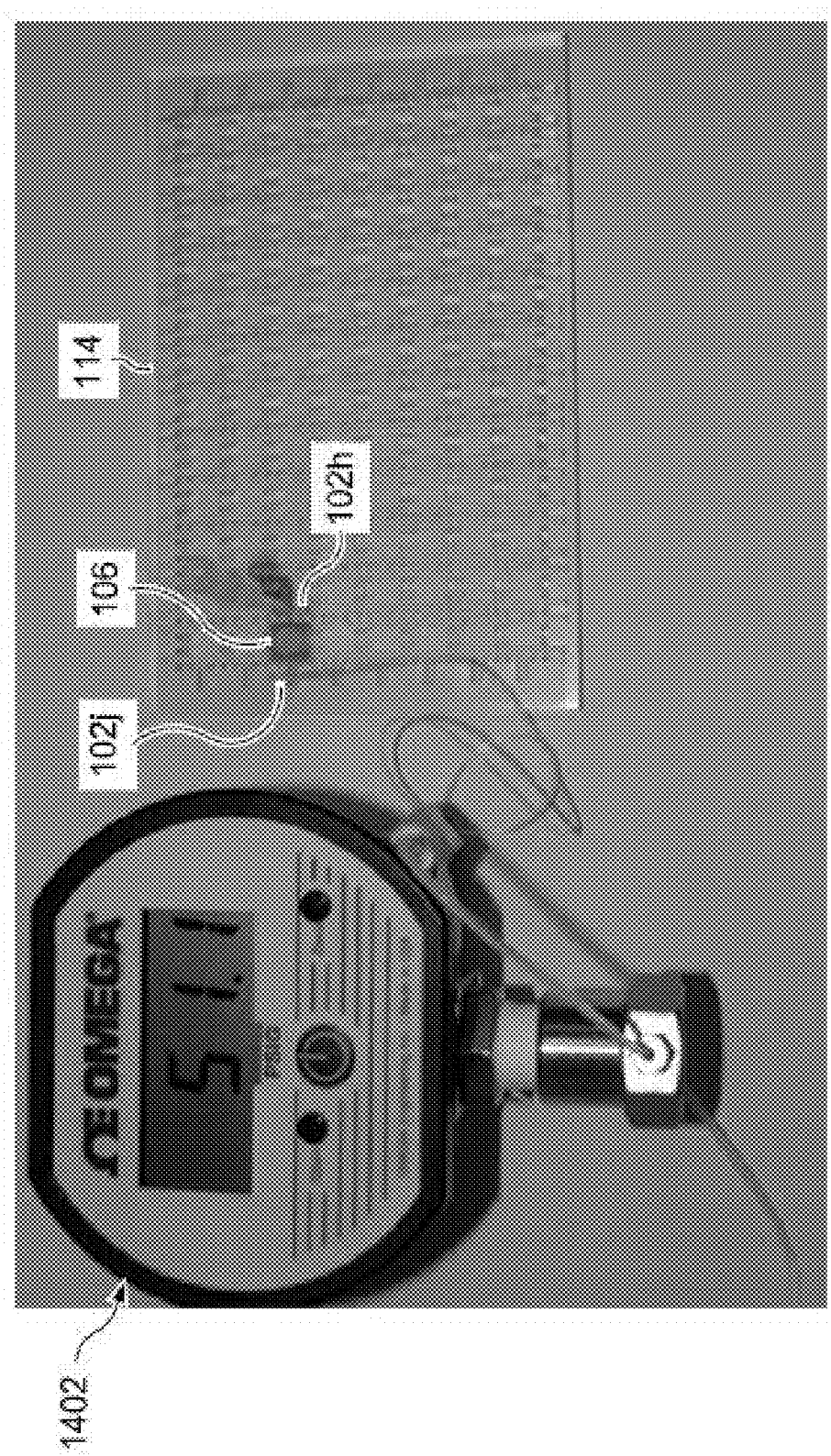

The inventors have performed several different experiments to confirm the functionality of the modular microfluidic system 100. The results of these experiments are discussed next with respect to FIGS. 14-17. In the first experiment, the inventors tested the pressure inside an exemplary modular microfluidic system 100a (see FIG. 14). FIG. 14 is a photo illustrating an exemplary modular microfluidic system 100a where a micromodule 106 was plugged into a T-shaped channel insert 102j and an H-shaped channel insert 102h via miniaturized luer fitting components 104 (not shown) all of which are on the motherboard 114. A syringe and syringe pump (not shown) were used to pump water into the modular microfluidic system 100a at 100 µl/min. A pressure gauge 1402 was connected between the syringe and the modular microfluidic system 100a. After the modular microfluidic system 100a was filled with water, the pumping was continued but the outlet of the system 100a was blocked to see if there was any fluidic leakage between any of the interconnections. Even at a pressure of 51.1 psi, no fluid leakage was observed and this particular experiment was stopped.

Figure 15A:
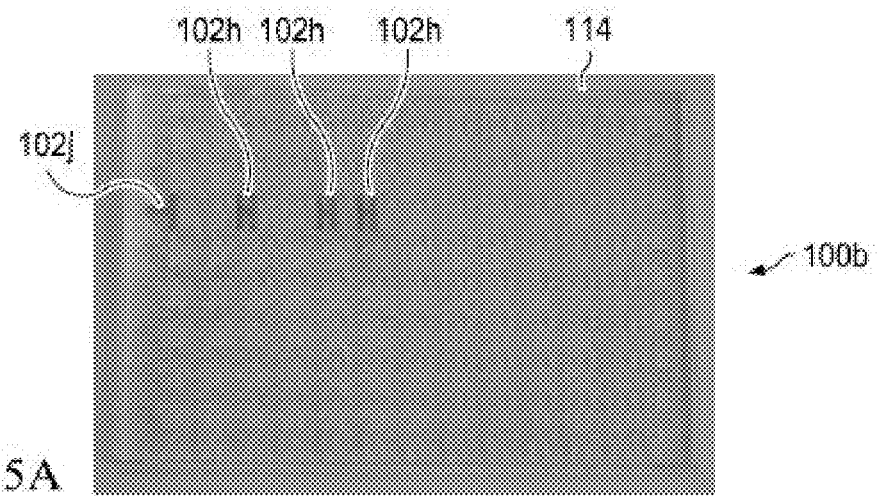
Figure 15B:
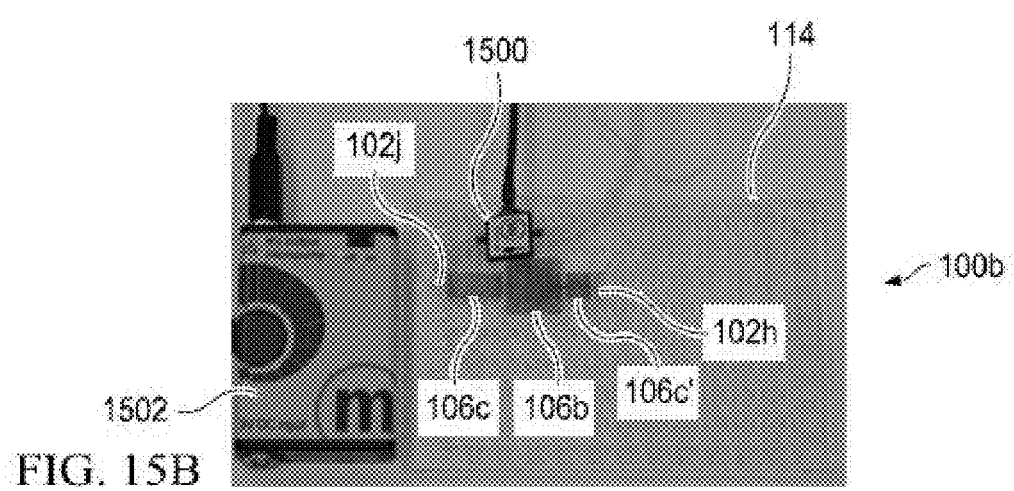
Figure 15C:
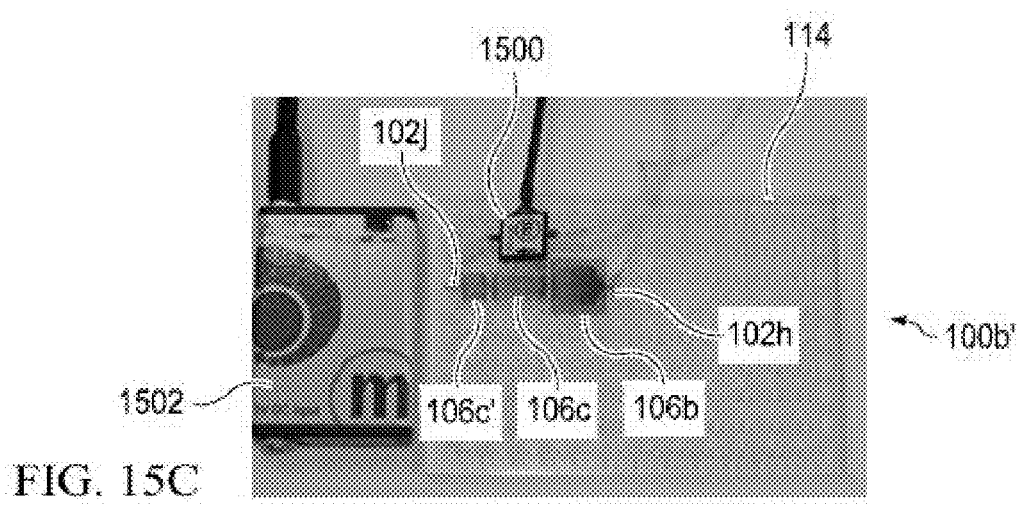

In the second experiment, the inventors built and tested exemplary modular microfluidic systems 100b and 100b' (see FIGS. 15A-15C). FIG. 15A is a photo illustrating a motherboard 114 on which there was first placed one T-shaped channel insert 102j and three H-shaped channel inserts 102h. FIG. 15B is a photo illustrating that a long reaction chamber micromodule 106c, a reaction chamber with flow deflector micromodule 106b and a small reaction chamber micromodule 106c' were plugged into the channel inserts 102h and 102j to form the modular microfluidic system 100b. Fluid flow (water and colored water) was provided by a portable micropump 1500 (Bartel Mikrotechik GmbH portable micropump 1500) that was powered by batteries 1502. FIG. 15C is a photo illustrating a re-configured modular microfluidic system 100b' which was made in less than a minute by unplugging and reconfiguring the components of the previous modular microfluidic system 100b.

Figure 16A:
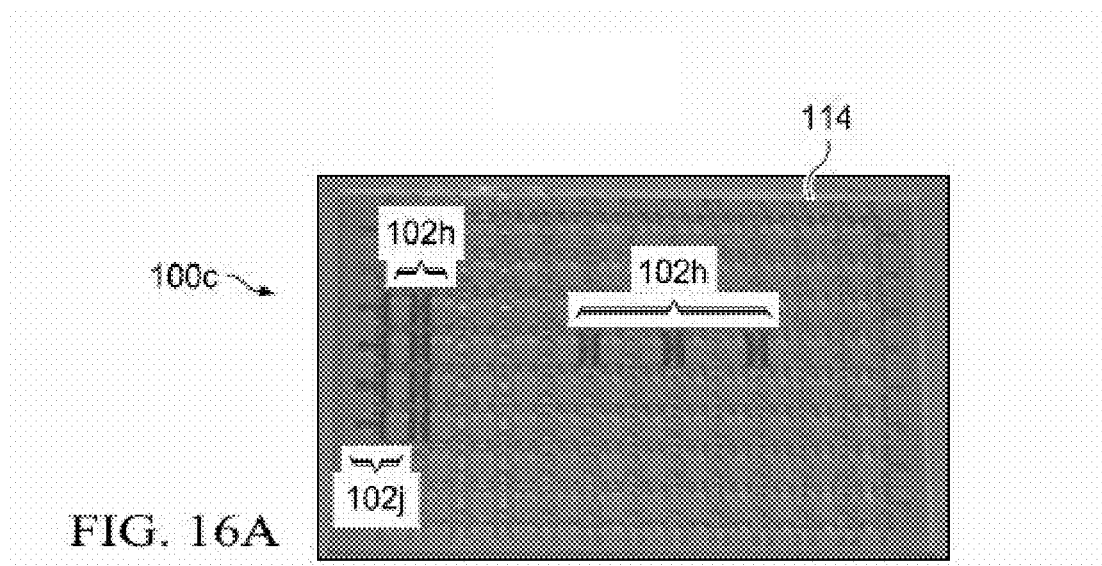
Figure 16B:
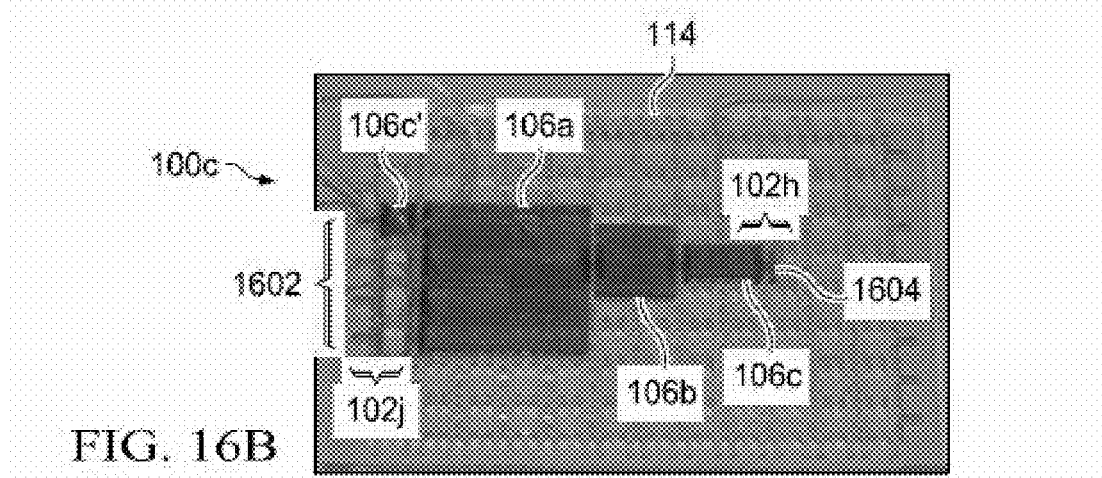
Figure 16C:
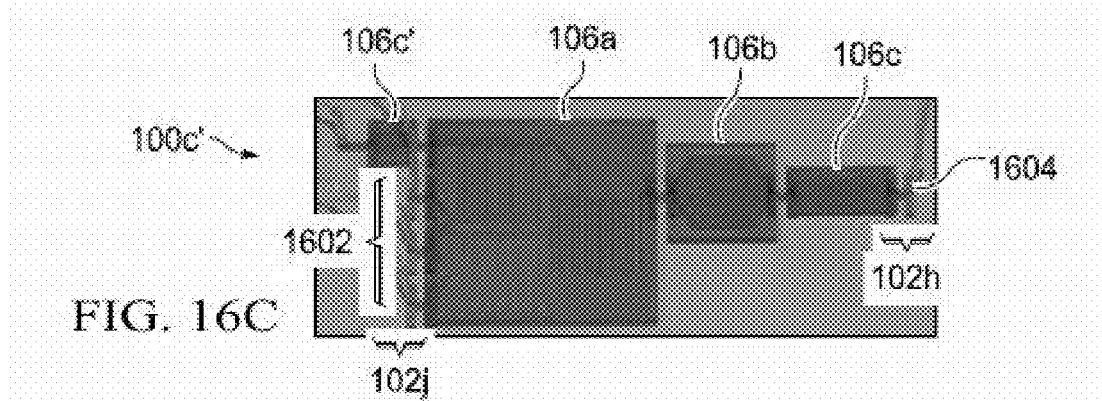

In the third experiment, the inventors built and tested exemplary modular microfluidic systems 100c and 100c' (see FIGS. 16A-16C). FIG. 16A is a photo illustrating a motherboard 114 on which there was first placed four T-shaped channel inserts 102j and seven H-shaped channel inserts 102h. FIG. 16B is a photo illustrating a small reaction chamber micromodule 106c', a large mixer micromodule 106a, a reaction chamber with flow deflector micromodule 106b and a long reaction chamber micromodule 106c plugged into the channel inserts 102h and 102j to form the modular microfluidic system 100c which has four inlets 1602 and one outlet 1604. Fluid flow (water and three different colored waters) was provided by syringe pumps. Each inlet flow rate was 10 µl/min. FIG. 16C is a photo illustrating the modular microfluidic system 100c' which is similar to the modular microfluidic system 100c discussed above but instead was built on a flat surface without the use of a motherboard 114.

In the fourth experiment, the inventors built and tested an exemplary modular microfluidic system 100d (see FIG. 17). FIG. 17 is a photo illustrating a motherboard 114 on which there was first placed two heaters 110 and then on top of each heater 110 there was placed a micromodule 106. The two heaters 110 were Thermofoil™ flexible heaters Models: HK5565R5.3L6B and HK5572R26.5L12B; Minco, Minneapolis, Minn. The photo also illustrates the thermal images depicting the temperature distribution inside the micromodules 106. In this experiment, a temperature of >90° C. was achieved with these heaters 110 without melting the micromodules 106.

In fabricating the plug-n-play modular microfluidic system 100, a wide-variety of technologies can be used. For example, standard microfabrication technology, injection molding technology, various rapid prototyping technologies such as soft lithography and stereolithography or any combination of these fabrication technologies can be used to fabricate the components of the plug-n-play modular microfluidic system 100. Also, the motherboard 114 can be fabricated using standard printed circuit board (PCB) technology. In this way, electrical circuits can be easily integrated into the motherboard 114. If desired, the motherboard 114 can contain slots and holes to help align the various components. An exemplary modular microfluidic system 100 which was manufactured on a printed circuit board (PCB) is described next with respect to FIG. 18.

Figure 18:
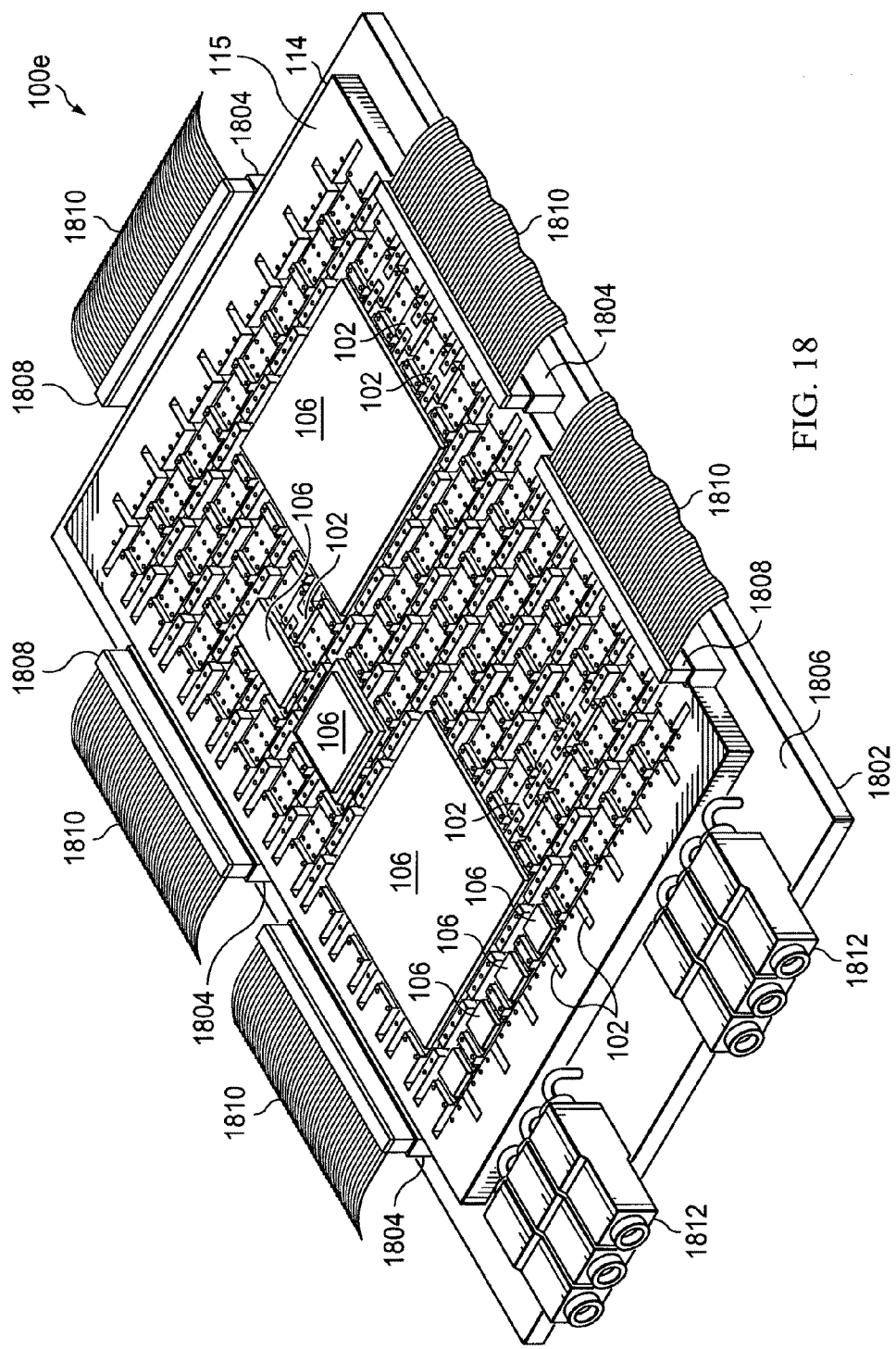
FIG. 18 is a perspective view of an exemplary modular microfluidic system built on a printed control circuit (PCB) board in accordance with embodiments of the present invention.
Figure 20A:
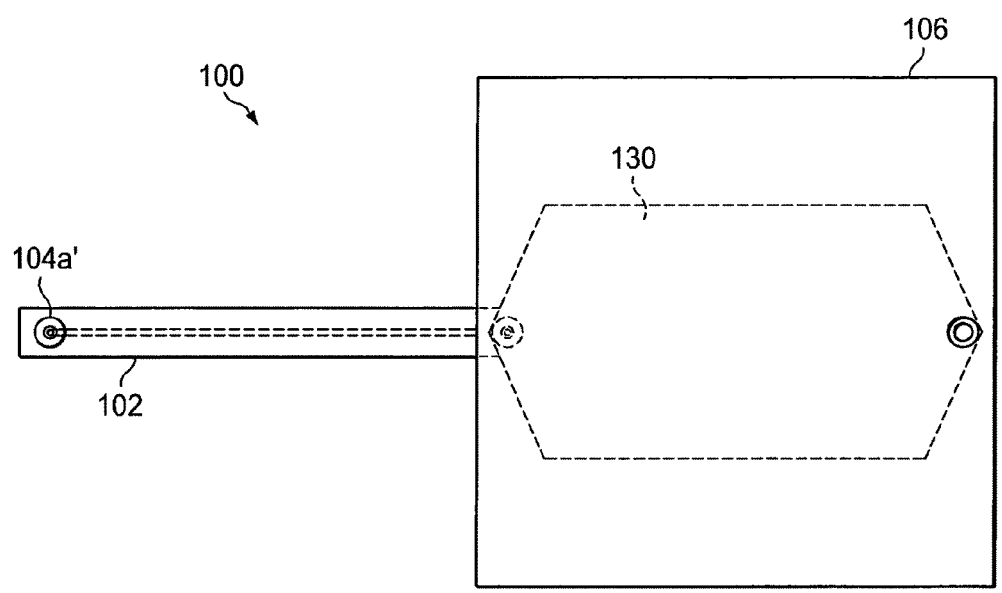
Figure 20B:
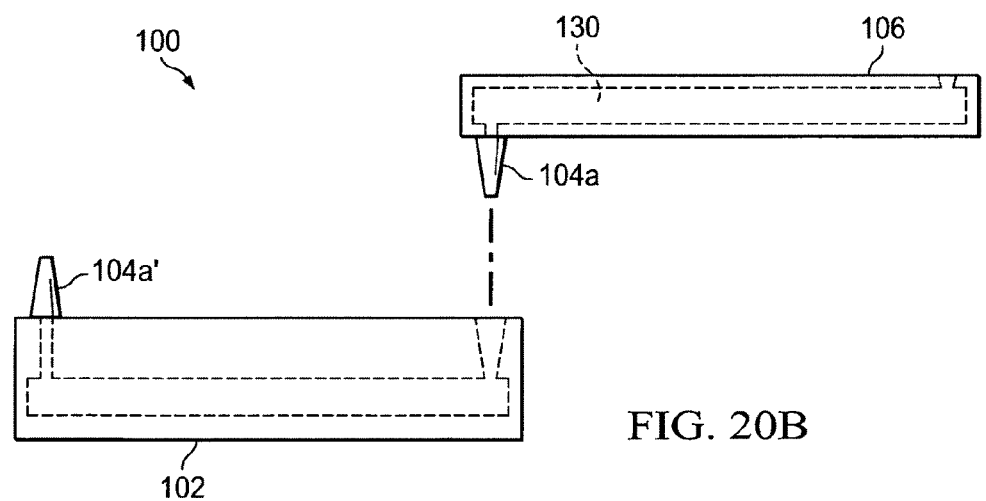
Figure 21A:
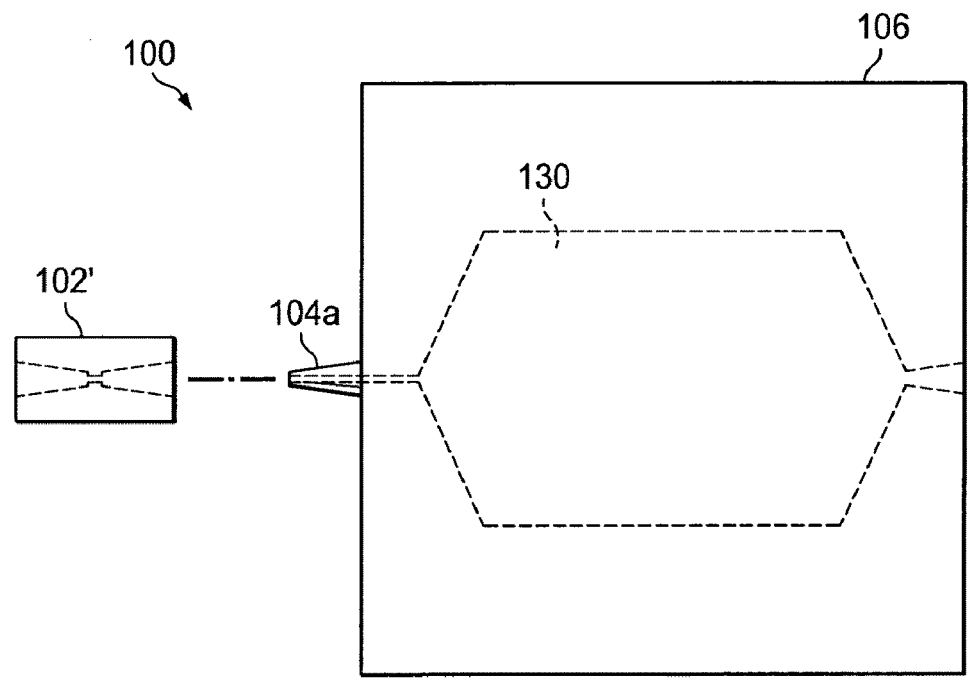
Figure 21B:
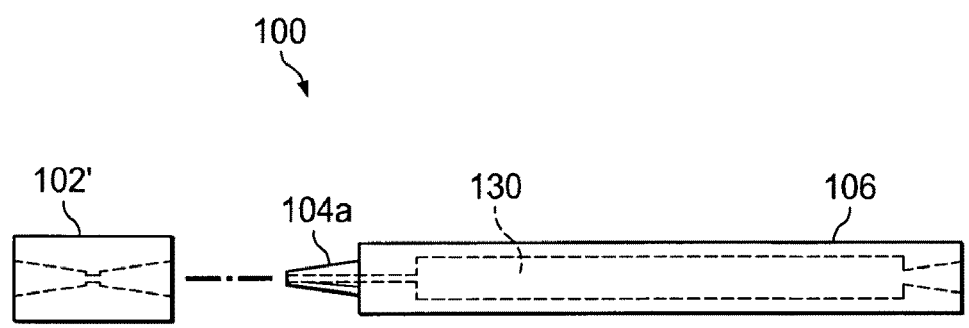
Figure 23B:
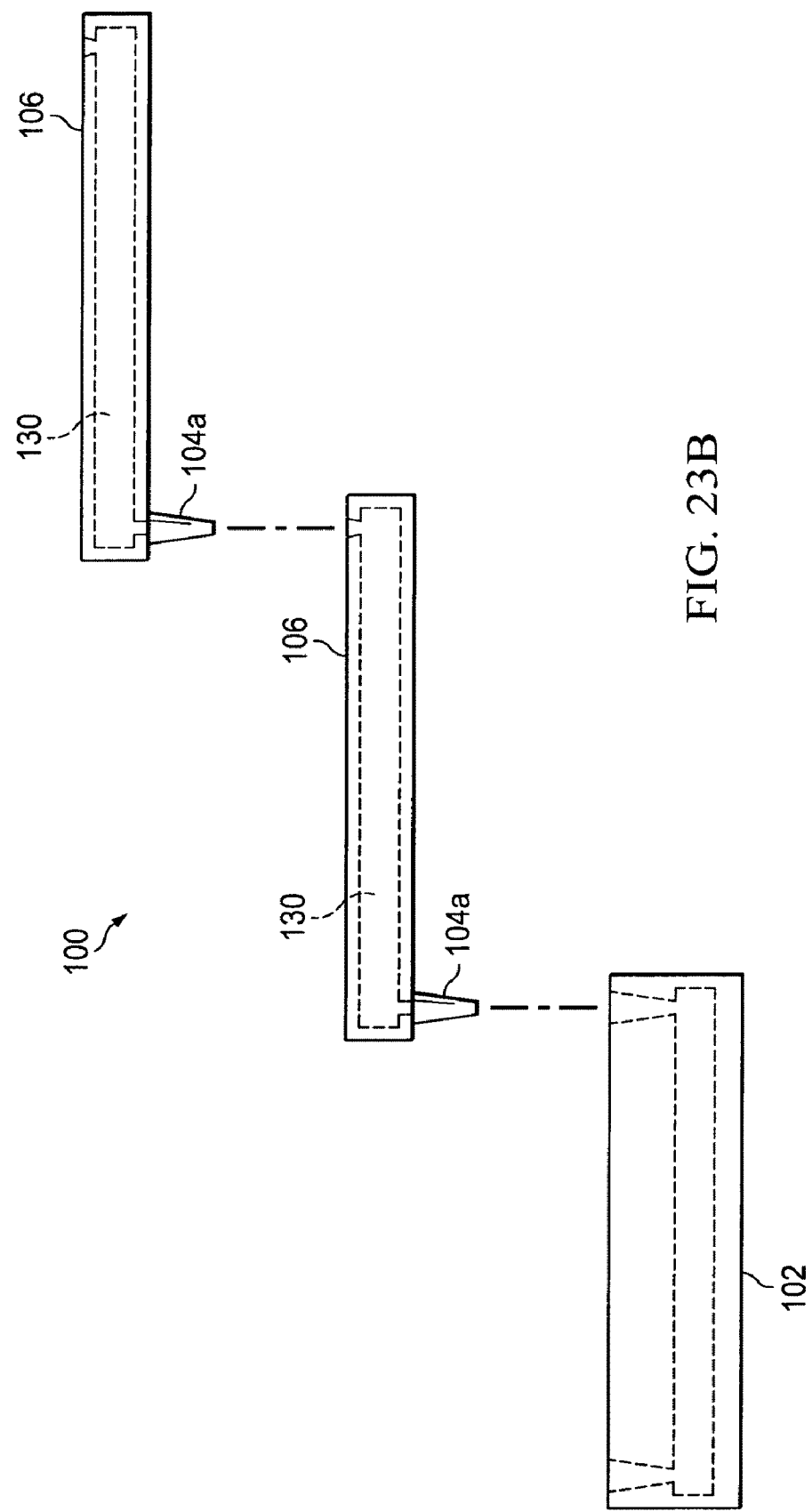
Figure 24B:
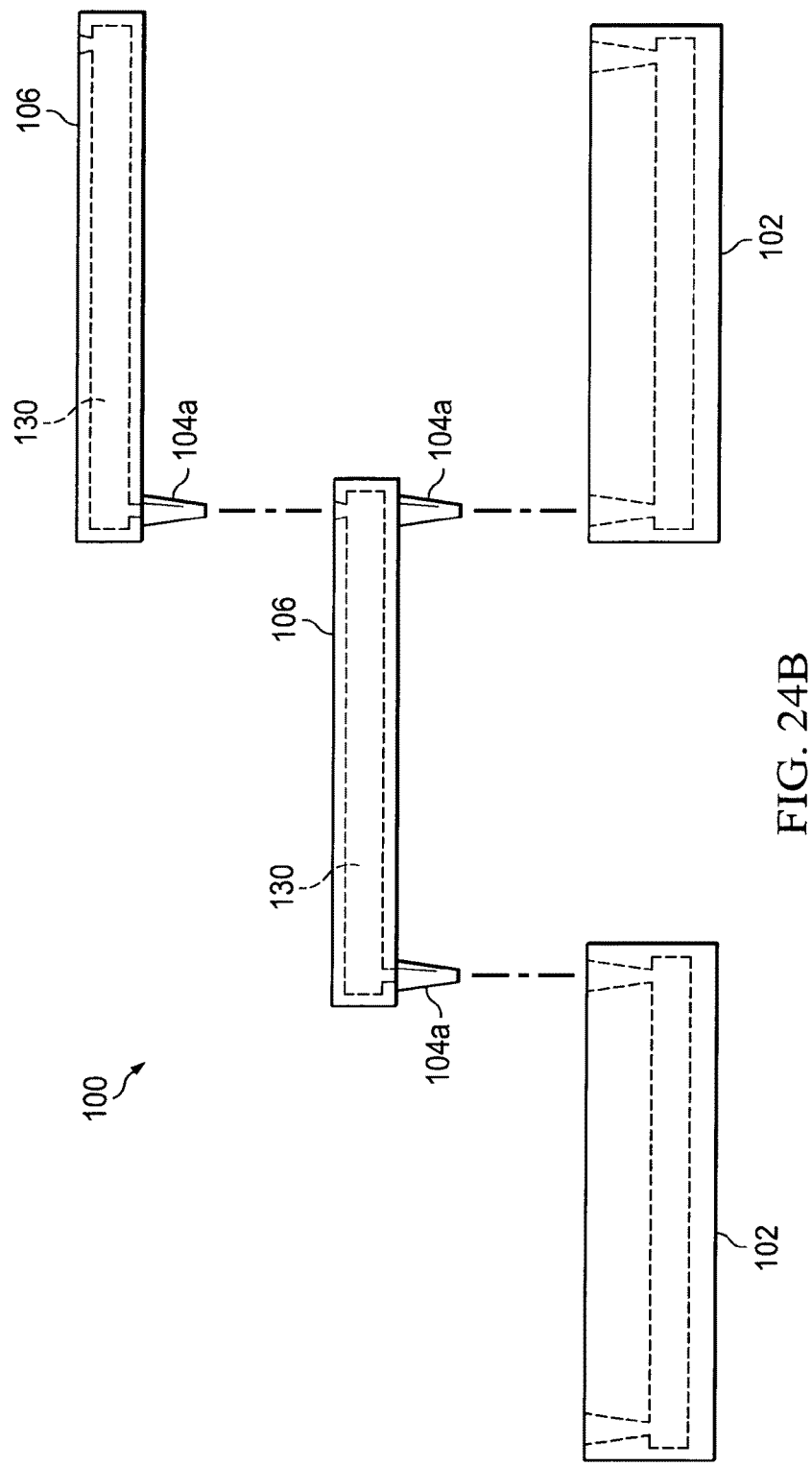

Referring to FIG. 18, there is a perspective view of an exemplary modular microfluidic system 100e manufactured on a Printed Circuit Board (PCB) 1802 in accordance with embodiments of the present invention. The modular microfluidic system 100e includes the PCB 1802 which has located thereon the motherboard 114 which has various channels fittings 102 and various micromodules 106 attached thereto. The motherboard 114 has integrated electrodes (not shown) that are connected to electrical pin connectors 1804 (five shown) located on a top surface 1806 of the PCB 1802. The electrical pin connectors 1804 are shown connected to cable connectors 1808 which have flexible cables 1810 extending therefrom that connect to the external electronics which provide data acquisition and system control. The PCB 1802 also has optical fiber connectors 1812 which can provide an interface to the motherboard 114 and be used for optical detection in micromodules 106 (see FIG. 12).

Referring to FIG. 19, there is a flowchart illustrating the steps of an exemplary method 1900 for building a modular microfluidic system 100 in accordance with embodiments of the present invention. At step 1902, a motherboard 114 is provided that has a top surface 115 with a network of channels 116. At steps 1904 and 1906, different types of channel inserts 102 are provided and then one or more channel inserts 102 are placed within one or more of the channels 116 located within the motherboard 114. At steps 1908 and 1910, there is provided at least one micromodule 106 where one of the micromodules 106 is connected via at least one fitting component 104 to at least one channel inserts 102 located within the motherboard 114. At step 1912 (optional), a pumping-valving actuator 108 can be provided and positioned between the motherboard 114 and one of the micromodules 106 prior to connecting the one micromodule 106 to the channel inserts 102 (see FIGS. 13). At step 1914 (optional), a heater 110 can be provided and positioned between the motherboard 114 and one of the micromodules 106 prior to connecting the one micromodule 106 to the channel inserts 102 (see FIG. 10). At step 1916 (optional), an electrical contact unit 112 can be provided and positioned between the motherboard 114 and one of the micromodules 106 prior to connecting the one micromodule 106 to the channel inserts 102 (see FIG. 11). Thus, to build an integrated modular microfluidic system 100, channel inserts 102 that contain channel(s) are first attached or placed into the slots or grooves 116 within the motherboard 114. Then, if one desires, a reusable actuator 108, heater 110, and/or electrical unit 112 can be attached to the motherboard 114 before a micromodule 106 (microchip 106) is attached to the channel inserts 102 with the aid fitting components 104.

While particular embodiments of the present invention have been described above, it should be understood, however, that the present invention is not limited to these embodiments, since many modifications may be made by those skilled in the art, particularly in light of the foregoing teachings. To illustrate this, several additional embodiments are discussed below to further illustrate some of the different possible connection-combinations that can be used to build a "plug-in-play" microfluidic system 100 in accordance with embodiments of the present invention. Also, it should be appreciated that the channel insert 102 is one of the many embodiments of the micromodules 106.

The exemplary microfluidic device 100 which where described above had at least two channel inserts 102 and at least one micromodule 106. However, in some cases, just one fitting component 104 and one micromodule 106 could be used to build a microfluidic device 100 (e.g., see two exemplary microfluidic devices 100 shown in FIGS. 20A-20B and 21A-21B). In other cases, at least two micromodules 106 can be used to build a microfluidic device 100 and no channel insert 102 would be required (e.g., see two exemplary microfluidic devices 100 shown in FIGS. 22A-22B). In addition, the components 102 and 106 can be plugged on top of each other to form a three-dimensional microfluidic system 100 (e.g., see two exemplary microfluidic devices 100 shown in FIGS. 23A-23B and 24A-24B). Alternatively, channel inserts 102 can also be plugged on top of the micromodule(s) 106 and other micromodule(s) 106 can then be plugged into the channel inserts 102 (not shown). In all of these cases, at least one fitting component 104 (male and female luer fittings for example) was used to make the microfluiding device 100 (note: the use of the motherboard 114 is optional). As can be seen, there are numerous combinations that can be used to make a desired microfluidic device 100 using the components of the present invention, and all of these combinations and alternatives form embodiments of the "plug-in-play" microfluidic device of the present invention.

Some of the additional advantages and features associated with the plug-n-play modular microfluidic system 100 are as follows:

- No extra components such as O-rings, planar gaskets, ferrules or thumbscrews are required in order to provide a leak free fluidic communication between the various components 102, 104 and 106.
- The microfluidic system 100 can allow the flow of gas instead of fluid.
- The motherboard 114 can provide all the electrical connections for heaters 110, actuators 108, etc. and external electronics which provide data acquisition and system control.
- All passive (reaction, detection, mixing, etc.) and active (pump, valve, etc.) functionalities can be built into the microchip components 106.
- The actuators 108, which can be placed anywhere on the motherboard 114, for pumping and valving are reusable and can be easily attached and detached from the motherboard 114.
- The components 102, 104, 106, 108, 110 and 112 can be easily rearranged, attached and detached for further use without any damages.
- All the microchip and channel components 102, 104 and 106 can be disposable and the motherboard 114, actuators 108, heaters 110, etc. can be reused to reduce the cost.
- Different configurations of an integrated microfluidic system 100 can be designed and built with ease.
- The motherboard 114 can have a standard microplate foot print and can be converted into, for example, a 96 well like microplate by attaching 96 individual chamber microchips 106.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

The invention claimed is:

1. A modular microfluidic system comprising:
   a motherboard having a top surface with a plurality of interconnecting channels and a plurality of depressions formed therein;
   at least one channel insert, each channel insert is sized to be placed within one of the interconnecting channels within said motherboard;
   at least one fitting component;
   at least one micromodule, where at least one micromodule is coupled via at least one fitting component to at least one channel insert, wherein there is fluid communication between said at least one micromodule, said at least one fitting component, and said at least one channel insert; and
   at least one of a pump-valve actuator, a heater, or an electrical pad which is sized to be positioned in at least one of the depressions formed within the motherboard, wherein the at least one of the pump-valve actuator, the heater, or the electrical pad is configured to be positioned between the motherboard and said at least one micromodule, and wherein the at least one of the pump-valve actuator, the heater, or the electrical pad is configured to be entirely covered by said at least one micromodule.

2. The modular microfluidic system of claim 1, wherein said at least one fitting component comprises a first end and a second end, wherein said first end is integrated with a micromodule and wherein said second end is configured to couple with a hole within said at least one channel insert.

3. The modular microfluidic system of claim 2, wherein the second end of said at least one fitting component is structured and arranged to couple with said at least one channel insert to form a barbed fitting, a taper fitting, a Luer fitting or a Luer lock fitting.

4. The modular microfluidic system of claim 1, wherein said at least one fitting component comprises a first end and a second end, wherein said at least one micromodule comprises a hole configured to receive the first end of said fitting component, and wherein the second end is integrated within said at least one channel insert.

5. The modular microfluidic system of claim 4, wherein the first end of said at least one fitting component is structured and arranged to couple with the hole in said at least one micromodule to form a barbed fitting, a taper fitting, a Luer fitting or a Luer lock fitting.

6. The modular microfluidic system of claim 1, wherein said at least one micromodule comprises a hole formed therein configured to receive a first end of said at least one fitting component which also has a second end configured to plug into a hole in said at least one channel insert.

7. The modular microfluidic system of claim 6, wherein the hole in said at least one micromodule and the first end of said at least one fitting component together comprise a barbed fitting, a taper fitting, a Luer fitting or a Luer lock fitting and the second end of said at least one fitting component and the hole in said at least one channel insert together comprise a barbed fitting, a taper fitting, a Luer fitting or a Luer lock fitting.

8. The modular microfluidic system of claim 1, wherein each heater receives electrical power via at least one electrode that extends therefrom and passes through at least one hole formed within said motherboard.

9. The modular microfluidic system of claim 1, wherein each pump-valve actuator receives electrical power via at least one electrode that extends therefrom and passes through at least one hole formed within said motherboard.

10. The modular microfluidic system of claim 1, wherein each pump-valve actuator has at least one electrical pad which contacts at least one electrode that is located within said motherboard.

11. The modular microfluidic system of claim 1, further comprising at least one electrical contact unit, where each electrical contact unit is configured to be positioned between said motherboard and one of said at least one micromodule.

12. The modular microfluidic system of claim 1, wherein one of said at least one micromodule receives electrical power via at least one electrode that extends therefrom and passes through at least one hole formed within said motherboard.

13. The modular microfluidic system of claim 1, wherein one of the at least one micromodule has at least one electrical pad which contacts at least one electrode that is located within said motherboard.

14. The modular microfluidic system of claim 1, wherein at least one micromodule interfaces with at least one optical fiber which passes through a hole in said motherboard.

15. The modular microfluidic system of claim 1, wherein said at least one micromodule is selected from:
    a channel insert;
    a pump micromodule;
    a valve micromodule;
    a heating micromodule;
    a mixing micromodule;
    a filtering micromodule;
    a detection micromodule;
    an electrophoresis micromodule;
    a reaction micromodule;
    a separation micromodule; or
    an isolation micromodule.

16. The modular microfluidic system of claim 1, wherein said motherboard is attached to a printed circuit board which has electrical pin connectors connected to integrated electrodes within the motherboard and the electrical pin connectors are connected to cable connectors.

17. A method for building a microfluidic system, said method comprising the steps of:
    providing a motherboard having a top surface with a plurality of interconnecting channels and a plurality of depressions formed therein;
    providing at least one channel insert;
    placing at least one channel insert within one or more of the interconnecting channels within said motherboard;
    providing at least one micromodule;
    connecting at least one micromodule to the at least one channel insert located within the one or more interconnecting channels of said motherboard, using at least one fitting component wherein there is fluid communication between said at least one micromodule, said at least one fitting component, and said at least one channel insert; and
    providing at least one of a pump-valve actuator, a heater, or an electrical pad which is sized to be positioned in at least one of the depressions formed within the motherboard, wherein the at least one of the pump-valve actuator, the heater, or the electrical pad is configured to be positioned between the motherboard and said at least one micromodule, and wherein the at least one of the pump-valve actuator, the heater, or the electrical pad is configured to be entirely covered by said at least one micromodule.

18. A kit for building a microfluidic device, said kit comprising:
    a motherboard having a top surface with a plurality of interconnecting channels and a plurality of depressions formed therein;
    at least one channel insert, each channel insert is sized to be placed within one of the interconnecting channels within said motherboard;
    at least one fitting component;
    at least one of a pump-valve actuator, a heater, or an electrical pad which is sized to be positioned in at least one of the depressions formed within the motherboard,
    at least one micromodule, where the microfluidic device is built using at a minimum one micromodule which is connected to one fitting component such that there is fluid communication between the one micromodule and the one fitting component, where the one micromodule and the one fitting component are coupled together via a barbed fitting, a taper fitting, a Luer fitting or a Luer lock fitting, where the microfluidic device is built by positioning the at least one of the pump-valve actuator, the heater, or the electrical pad between the motherboard and said at least one micromodule, and where the at least one of the pump-valve actuator, the heater, or the electrical pad is configured to be entirely covered by said at least one micromodule.

19. The kit of claim 18, wherein at least one micromodule is coupled via at least one fitting component to at least one channel insert which is located within one of the channels of said motherboard.

20. The modular microfluidic system of claim 1, the motherboard further includes integrated electrodes or holes for electrodes to pass and holes for optical fibers to pass.

21. The modular microfluidic system of claim 1, wherein the at least one channel insert is selected from:
    a short straight channel insert;
    a medium straight channel insert;
    a long straight channel insert;
    a short left-turn channel insert;
    a long left-turn channel insert;
    a short right-turn channel insert;
    a long right-turn channel insert;
    a small H-shaped channel insert;
    a large H-shaped channel insert;
    a small T-shaped channel insert; and
    a large T-shaped channel insert.

22. The modular microfluidic system of claim 1, wherein the pump-valve actuator includes three pistons that are controlled to raise and lower in a predetermined sequence to pump a fluid in any desired direction within a channel of the at least one micromodule.

23. The modular microfluidic system of claim 1, wherein the at least one channel insert has a channel therein and incorporates a turn valve which is controlled to allow or prevent a flow of a liquid or gas within the channel.

24. The method of claim 17, the motherboard further includes integrated electrodes or holes for electrodes to pass and holes for optical fibers to pass.

25. The method of claim 17, wherein the at least one channel insert is selected from:
   a short straight channel insert;
   a medium straight channel insert;
   a long straight channel insert;
   a short left-turn channel insert;
   a long left-turn channel insert;
   a short right-turn channel insert;
   a long right-turn channel insert;
   a small H-shaped channel insert;
   a large H-shaped channel insert;
   a small T-shaped channel insert; and
   a large T-shaped channel insert.

26. The method of claim 17, wherein the pump-valve actuator includes three pistons that are controlled to raise and lower in a predetermined sequence to pump a fluid in any desired direction within a channel of the at least one micromodule.

27. The method of claim 17, wherein the at least one channel insert has a channel therein and incorporates a turn valve which is controlled to allow or prevent a flow of a liquid or gas within the channel.

28. The kit of claim 18, the motherboard further includes integrated electrodes or holes for electrodes to pass and holes for optical fibers to pass.

29. The kit of claim 18, wherein the at least one channel insert is selected from:
   a short straight channel insert;
   a medium straight channel insert;
   a long straight channel insert;
   a short left-turn channel insert;
   a long left-turn channel insert;
   a short right-turn channel insert;
   a long right-turn channel insert;
   a small H-shaped channel insert;
   a large H-shaped channel insert;
   a small T-shaped channel insert; and
   a large T-shaped channel insert.

30. The kit of claim 18, wherein the pump-valve actuator includes three pistons that are controlled to raise and lower in a predetermined sequence to pump a fluid in any desired direction within a channel of the at least one micromodule.

31. The kit of claim 18, wherein the at least one channel insert has a channel therein and incorporates a turn valve which is controlled to allow or prevent a flow of a liquid or gas within the channel.

32. A three-dimensional modular microfluidic system comprising:
   at least one channel insert,
   at least one fitting component;
   at least one micromodule, where at least one micromodule is coupled via at least one fitting component to at least one channel insert, wherein there is fluid communication between said at least one micromodule, said at least one fitting component, and said at least one channel insert, wherein an end of the at least one fitting component is structured and arranged to couple with the at least one channel insert to form a barbed fitting, a taper fitting, a Luer fitting or a Luer lock fitting, and wherein a motherboard is not used in the three-dimensional modular microfluidic system.

* * * * *